US011999630B2

(12) United States Patent
Libera et al.

(10) Patent No.: US 11,999,630 B2
(45) Date of Patent: Jun. 4, 2024

(54) METHOD OF TUNING THE CONVERSION TEMPERATURE OF CUBIC PHASE OF ALUMINUM-DOPED LITHIUM LANTHANUM ZIRCONIUM OXIDE

(71) Applicant: UCHICAGO ARGONNE, LLC, Chicago, IL (US)

(72) Inventors: Joseph A. Libera, Clarendon Hills, IL (US); Yujia Liang, Lisle, IL (US); Trevor L. Dzwiniel, Carol Stream, IL (US); Krzysztof Pupek, Plainfield, IL (US); Gregory K. Krumdick, Homer Glen, IL (US); Stephen Cotty, Lemont, IL (US)

(73) Assignee: UChicago Argonne, LLC, Chicago, IL (US)

(*) Notice: Subject to any disclaimer, the term of this patent is extended or adjusted under 35 U.S.C. 154(b) by 846 days.

(21) Appl. No.: 16/901,998

(22) Filed: Jun. 15, 2020

(65) Prior Publication Data
US 2020/0392014 A1    Dec. 17, 2020

Related U.S. Application Data

(60) Provisional application No. 62/861,898, filed on Jun. 14, 2019.

(51) Int. Cl.
| C01G 25/02 | (2006.01) |
| B01J 2/06  | (2006.01) |
| C01G 25/00 | (2006.01) |

(52) U.S. Cl.
CPC .............. *C01G 25/006* (2013.01); *B01J 2/06* (2013.01); *C01P 2002/54* (2013.01); *C01P 2002/72* (2013.01); *C01P 2002/76* (2013.01); *C01P 2004/02* (2013.01); *C01P 2004/03* (2013.01)

(58) Field of Classification Search
CPC ........... C01G 25/02; C23C 4/11; C23C 4/129; H01M 10/0052; H01M 10/0562; B01J 2/06
See application file for complete search history.

(56) References Cited

U.S. PATENT DOCUMENTS

| 5,851,696 A     | 12/1998 | Saidi et al.    |
| 7,211,236 B2    | 5/2007  | Stark et al.    |
| 8,753,601 B2    | 6/2014  | Stark et al.    |
| 10,333,123 B2   | 6/2019  | Thokchom et al. |
| 10,818,968 B2   | 10/2020 | Kim et al.      |
| 2011/0053001 A1 | 3/2011  | Babic et al.    |
| 2011/0150737 A1 | 6/2011  | Stark et al.    |
| 2017/0207456 A1 | 7/2017  | Liu et al.      |

(Continued)

FOREIGN PATENT DOCUMENTS

WO    WO 2021048249 A1 *  3/2021

OTHER PUBLICATIONS

Djenadic et al "Nebulized spray pyrolysis of Al-doped Li7La3Zr2O12 solid electrolyte for battery applications", Solid State Ionics 263 (2014) 49-56.*

(Continued)

*Primary Examiner* — Mark Kopec
(74) *Attorney, Agent, or Firm* — Foley & Lardner LLP

(57) ABSTRACT

A process for forming cubic LLZO through the use of atomic mixing of metal salts used in an aerosol process. The cubic LLZO is formed at temperatures below 1000° C.

15 Claims, 33 Drawing Sheets

(56) References Cited

U.S. PATENT DOCUMENTS

| | | |
|---|---|---|
| 2019/0036159 A1 | 1/2019 | Kim et al. |
| 2019/0051934 A1 | 2/2019 | Kim et al. |
| 2019/0386311 A1 | 12/2019 | Bauer et al. |
| 2020/0044281 A1* | 2/2020 | Zhu .............. H01M 10/0525 |
| 2020/0373552 A1 | 11/2020 | Albano et al. |
| 2020/0392014 A1 | 12/2020 | Libera et al. |
| 2020/0403269 A1* | 12/2020 | Zhu ................ H01M 10/052 |
| 2021/0198117 A1 | 7/2021 | Durham et al. |
| 2021/0253440 A1* | 8/2021 | Daemen .............. C01G 25/006 |
| 2021/0305568 A1 | 9/2021 | Kanada et al. |
| 2021/0399331 A1 | 12/2021 | Sakamoto et al. |
| 2022/0006071 A1 | 1/2022 | Petrowsky et al. |
| 2022/0025502 A1* | 1/2022 | Durham ............... H01M 4/525 |
| 2022/0336841 A1 | 10/2022 | Schafer et al. |
| 2023/0102140 A1 | 3/2023 | Zhang et al. |

OTHER PUBLICATIONS

Adachi, et al., "Fast Li? Conducting Ceramic Electrolytes," Advanced Materials 8(2), pp. 127-135 (1996).

Buesser & Pratsinis, "Design of Nanomaterial Synthesis by Aerosol Processes," Annual Review of Chemical and Biomolecular Engineering 3, pp. 103-127 (2012).

Chen, et al., "A study of suppressed formation of low-conductivity phases in doped Li7La3Zr2O12 garnets by in situ neutron diffraction," Journal of Materials Chemistry A 3(45), pp. 22868-22876 (2015).

Deng, et al., "Structure and electrochemical performance of spinel LiMn1.95Ni0.05O3.98F0.02 coated with Li—La—Zr—O solid electrolyte," Journal of Solid State Electrochemistry 18, pp. 249-255 (2014).

Gurav, et al., "Aerosol Processing of Materials," Aerosol Science and Technology 19(4), pp. 411-452 (1993).

Heo, et al., "Enhanced Electrochemical Performance of Ionic-Conductor Coated Li[Ni0.7Co0.15Mn0.15]O2," Journal of the Electrochemical Society 164(12), pp. A2398-A2402 (2017).

Kelesidis, et al., "Flame synthesis of functional nanostructured materials and devices: Surface growth and aggregation," Proceedings of the Combustion Institute 36(1), pp. 29-50 (2017).

Koirala, et al., "Synthesis of catalytic materials in flames: opportunities and challenges," Chemical Society Reviews 45(11), pp. 3053-3068 (2016).

Kotobuki & Koishi, "Influence of precursor calcination temperature on sintering and conductivity of Li1.5Al0.5Ti1.5(PO4)3 ceramics," Journal of Asian Ceramic Societies 7(1), pp. 69-74 (2019).

Lamoreaux & Hildenbrand, "High Temperature Vaporization Behavior of Oxides. I. Alkali Metal Binary Oxides," Journal of Physical and Chemical Reference Data 13, pp. 151-173 (1984).

Lenggoro, et al., "An experimental and modeling investigation of particle production by spray pyrolysis using a laminar flow aerosol reactor," Journal of Materials Research 15(3), pp. 733-743 (2000).

Liang, et al., "Colloidal spray pyrolysis: A new fabrication technology for nanostructured energy storage materials," Energy Storage Materials 13, pp. 8-18 (2018).

Liang, et al., "Cu—Sn binary metal particle generation by spray pyrolysis," Aerosol Science and Technology 51(3), pp. 430-442 (2017).

Murugan, et al., "Fast Lithium Ion Conduction in Garnet-Type Li7La3Zr2O12," Angewandte Chemie 46(41), pp. 7778-7781 (2007).

Park, et al., "Electrochemical Properties of Composite Cathode Using Bimodal Sized Electrolyte for All-Solid-State Batteries," Journal of the Electrochemical Society 166(3), pp. A5318-A5322 (2019).

Rangasamy, et al., "The role of Al and Li concentration on the formation of cubic garnet solid electrolyte of nominal composition Li7La3Zr2O12," Solid State Ionics 206, pp. 28-32 (2012).

Ren, et al., "Chemical compatibility between garnet-like solid state electrolyte Li6.75La3Zr1.75Ta0.25O12 and major commercial lithium battery cathode materials," Journal of Materiomics 2(3), pp. 256-264 (2016).

Sakamoto, et al., "Synthesis of nano-scale fast ion conducting cubic Li7La3Zr2O12," Nanotechnology 24(42), 8 pages (213).

Sharafi, et al., "Impact of air exposure and surface chemistry on Li—Li7La3Zr2O12 interfacial resistance," Journal of Materials Chemistry A 5(26), pp. 13475-13787 (2017).

Stern, "High Temperature Properties and Decomposition of Inorganic Salts Part 3, Nitrates and Nitrites," Journal of Physical and Chemical Reference Data 1, pp. 747-772 (1972).

Yi, "Aerosol Combustion Synthesis of Nanopowders and Processing to Functional Thin Films," Ph.D. Thesis, University of Michigan Horace H. Rackham School of Graduate Studies, 97 pages (2017).

Yi, et al., "Key parameters governing the densification of cubic-Li7La3Zr2O12 Li conductors," Journal of Power Sources 352, pp. 156-164 (2017).

Zhang, et al., "Mechanism Study on the Interfacial Stability of a Lithium GarnetType Oxide Electrolyte against Cathode Materials," ACS Applied Energy Materials 1(11), pp. 5968-5976 (2018).

Gordon, et al., "Preparation of Nano- and Microstructured Garnet Li7La3Zr2O12 Solid Electrolytes for Li-Ion Batteries via Cellulose Templating," ACS Sustainable Chemistry & Engineering 4(12), pp. 6391-6398 (2016).

Jin & Mcginn, "Al-doped Li7La3Zr2O12 synthesized by a polymerized complex method," Journal of Power Sources 196(20), pp. 8683-8687 (2011).

Kokal, et al., "Sol-gel synthesis and lithium ion conductivity of Li7La3Zr2O12 with garnet-related type structure," Solid State Ionics 185(1), pp. 42-46 (2011).

Madler, et al., "Controlled synthesis of nanostructured particles by flame spray pyrolysis," Journal of Aerosol Science 33(2), pp. 369-389 (2002).

Mentus, et al., "Lanthanum nitrate decomposition by both temperature programmed heating and citrate gel combustion," Journal of Thermal Analysis and Calorimetry 90, pp. 393-397 (2007).

Michalow-Mauke, et al., "Flame-Made WO3/CeOx-TiO2 Catalysts for Selective Catalytic Reduction of NOx by NH3," ACS Catalysis 5(10), pp. 5657-5672 (2015).

Ren, et al., "Oxide Electrolytes for Lithium Batteries," Journal of the American Ceramic Society 98(12), pp. 3603-3623 (2015).

Samson, et al., "A bird's-eye view of Li-stuffed garnet-type Li7La3Zr2O12 ceramic electrolytes for advanced all-solid-state Li batteries," Energy & Environmental Science 12(10), pp. 2957-2975 (2019).

Schnell, et al., "Prospects of production technologies and manufacturing costs of oxide-based all-solid-state lithium batteries," Energy & Environmental Science 12(6), pp. 1818-1833 (2019).

Shimonishi, et al., "Synthesis of garnet-type Li7-xLa3Zr2O12-1/2x and its stability in aqueous solutions," Solid State Ionics 183(1), pp. 48-53 (2011).

Wang, et al., "Experimental study and thermodynamic modelling of the ZrO2—LaO1.5 system," Calphad 32(1), pp. 111-120 (2008).

Wu, et al., "Utmost limits of various solid electrolytes in all-solid-state lithium batteries: A critical review," Renewable and Sustainable Energy Reviews 109, pp. 367-385 (2019).

Xu, et al., "Multistep sintering to synthesize fast lithium garnets," Journal of Power Sources 302, pp. 291-297 (2016).

Yi, et al., "Flame made nanoparticles permit processing of dense, flexible, Li conducting ceramic electrolyte thin films of cubic-Li7La3Zr2O12 (c-LLZO)," Journal of Materials Chemistry A 4(33), pp. 12947-12954 (2016).

Zhao, et al., "Particle size distribution function of incipient soot in laminar premixed ethylene flames: effect of flame temperature," Proceedings of the Combustion Institute 30(1), pp. 1441-1448 (2005).

* cited by examiner

FIG. 1

LLZO FSP Synthesis Experiments

Prior Art Samples

| Sample | SOL | Solid Yield | Recipe No. | Solvent (v/v%) | | | | | | Solute s(g/L) | | | | 800°C x 12hr | | Mass Loss |
|---|---|---|---|---|---|---|---|---|---|---|---|---|---|---|---|---|
| | | | | ETOH | AcOH | Water | Prop | Xylene | EHA | Li-Prop | LA-IBR | Zr-IBR | Al | FP | CIP | |
| S13 | 26 | 3 wt% | Mich-1 | 90% | 10% | - | - | - | - | 21.2 | 33.9 | 16.9 | 0 | t | | 24% |
| S14 | 33 | 3 wt% | Mich-1 | 67% | 38% | 5% | - | - | - | 21.2 | 33.9 | 16.9 | 2.73 | t | | 30% |
| S15 | 34 | 6 wt% | Mich-2 | 67% | 38% | 5% | - | - | - | 42.3 | 67.8 | 33.8 | 5.48 | t | | 24% |
| S16 | 35 | 9 wt% | Mich-3 | 67% | 38% | 5% | - | - | - | 63.5 | 101.6 | 50.6 | 8.22 | t | | 24% |
| S25 | 38 | 3 wt% | Mich-4 | 49% | - | 1% | 50% | - | - | 21.2 | 33.9 | 16.9 | 2.73 | c | | 25% |
| S31 | 52 | 6 wt% | Mich-5 | 48% | - | 2% | 50% | - | - | 42.3 | 67.8 | 33.8 | 5.5 | t | CIP | 25% |
| S50 | 68 | 3 wt% | Mich-6 | - | - | - | 50% | 50% | - | 21.2 | 33.9 | 16.9 | 2.73 | t | | 18% |
| S55 | 38 | 3 wt% | Mich-4 | 49% | - | 1% | 50% | - | - | 21.2 | 33.9 | 16.9 | 2.73 | t | | |
| S130 | 126 | 3 wt% | Mich-1 | 87% | 9% | 4% | - | - | - | 26.3 | 41.9 | 21.1 | 3.6 | t | | 26% |
| S135 | 126 | 3 wt% | Mich-1 | 87% | 9% | 4% | - | - | - | 26.3 | 41.9 | 21.1 | 3.6 | c | | 23% |

Embodiments of the Present Invention

| Sample | SOL | Solid Yield | Recipe No. | Solvent (v/v%) | | | | | | Solute s(g/L) | | | | 800°C x 12hr | | Mass Loss |
|---|---|---|---|---|---|---|---|---|---|---|---|---|---|---|---|---|
| | | | | ETOH | AcOH | Water | Prop | Xylene | EHA | Li-EHA | La-EHA | Zr-EHA | Al | FP | CIP | |
| S17 | 40 | 3 wt% | ANL-1 | - | - | - | - | 75% | 25% | 44.0 | 53.3 | 41.5 | 3.1 | c | | 16% |
| S28 | 47 | 3 wt% | ANL-2 | - | - | - | - | 75% | 25% | 42.9 | 52.0 | 44.5 | 3.1 | t | | 21% |
| S29 | 48 | 6 wt% | ANL-3 | - | - | - | - | 47% | 53% | 91.3 | 110.6 | 86.1 | 6.5 | c | | 21% |
| S34 | 54 | 6 wt% | ANL-4 | - | - | - | - | 47% | 53% | 91.3 | 110.6 | 86.1 | 5.0 | t | CIP | 17% |
| S54 | 40 | 3 wt% | ANL-1 | - | - | - | - | 75% | 25% | 44.0 | 53.3 | 41.5 | 3.1 | c | | 13% |
| S61 | 75 | 3 wt% | ANL-5 | - | - | - | - | 76% | 24% | 30.8 | 53.3 | 41.5 | 3.1 | c | | 12% |

| Sample | SOL | Solid Yield | Recipe No. | Solvent (v/v%) | | | | | | Solute s(g/L) | | | | 800°C x 12hr | | Mass Loss |
|---|---|---|---|---|---|---|---|---|---|---|---|---|---|---|---|---|
| | | | | ETOH | AcOH | Water | Prop | Xylene | EHA | LiNO3 | LaNO3 | ZrNO3 | AlNo3 | FP | CIP | |
| S132 | 127 | 3 wt% | ANL-6 | 100% | - | - | - | - | - | 22.0 | 45.0 | 24.0 | 3.0 | c | | 13% |

FIG. 2A

LLZO FSP Synthesis Experiments

Prior Art Samples

| Sample | SOL | Solid Yield | Recipe No. | Notes |
|---|---|---|---|---|
| S13 | 26 | 3 wt% | Mich-1 | Based on E. Yi but acetic acid was required to dissolve reagents - 0 Al |
| S14 | 33 | 3 wt% | Mich-1 | Based on E. Yi but acetic acid was required to dissolve reagents |
| S15 | 34 | 6 wt% | Mich-2 | Based on Mich-1 but 6% solids yield |
| S16 | 35 | 9 wt% | Mich-3 | Based on Mich-1 but 9% solids yield |
| S25 | 38 | 3 wt% | Mich-4 | Based on Mich-1 but with increased solvent enthalpy using propionic acid |
| S31 | 52 | 6 wt% | Mich-5 | Based on Mich-1 but 6% solids yield |
| S50 | 68 | 3 wt% | Mich-6 | Based on Mich-1 but using xylene/propionic acid for solvent |
| S55 | 38 | 3 wt% | Mich-4 | Repeat S25 - got tetragonal instead of cubic |
| S130 | 126 | 3 wt% | Mich-1 | Baseline run for comparison to combustion tube flame confinement S135 |
| S135 | 126 | 3 wt% | Mich-1 | Flame confinement experiment using half of the solution made for S130 |

Embodiments of the Present Invention

| Sample | SOL | Solid Yield | Recipe No. | Notes |
|---|---|---|---|---|
| S17 | 40 | 3 wt% | ANL-1 | ANL-1 recipe based on 2-ethylhexanoic acid salts |
| S28 | 47 | 3 wt% | ANL-2 | Based on ANL-1 but with 10% excess Zr |
| S29 | 48 | 6 wt% | ANL-3 | Based on ANL-1 but with 6% solids yield |
| S34 | 54 | 6 wt% | ANL-4 | Based on ANL-3 but using Al(acac)3 in place of alumatrane |
| S54 | 40 | 3 wt% | ANL-1 | |
| S61 | 75 | 3 wt% | ANL-5 | Based on ANL-1 but with 5% excess Li instead of 50% |
| S132 | 127 | 3 wt% | ANL-6 | Nitrate-based recipe |

FIG. 2B

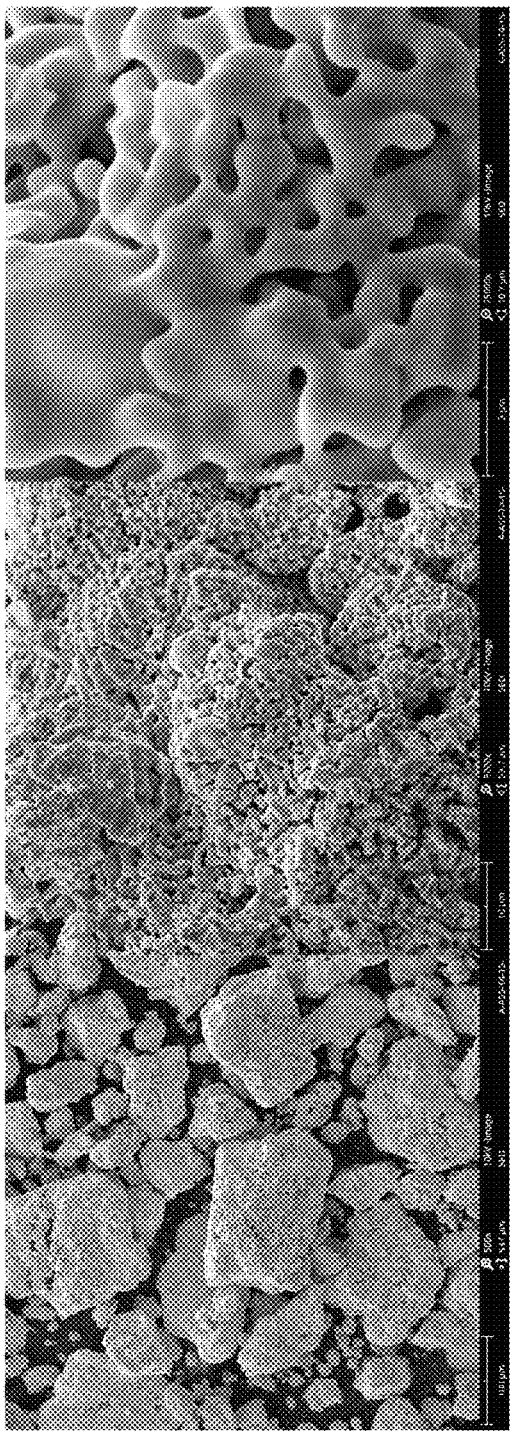
FIG. 10A  FIG. 10B  FIG. 10C  FIG. 10D  FIG. 10E  FIG. 10F

METHOD OF TUNING THE CONVERSION TEMPERATURE OF CUBIC PHASE OF ALUMINUM-DOPED LITHIUM LANTHANUM ZIRCONIUM OXIDE

STATEMENT OF GOVERNMENT INTEREST

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates to synthesis methods. More particularly, the present disclosure relates to systems, methods, and compositions for cubic aluminum-doped lithium lanthanum zirconium oxide.

BACKGROUND

All-solid-state batteries ("ASSBs") have been regarded as a replacement for their liquid counterpart in terms of high volumetric energy density, safe and environmentally-benign materials, and high electrochemical stability. Up to now, the reported solid state electrolytes ("SSEs") are based on garnets, perovskites, sulfides, and hydrides. Among them, garnet-type lithium lanthanum zirconium oxide ($Li_7La_3Zr_2O_{12}$; "LLZO") is the most applicable one due to its high ionic conductivity, extraordinary chemical stability towards electrode materials, and wide operating voltage windows. LLZO occurs in two phases tetragonal and cubic, with the tetragonal phase being the stable room temperature form and cubic being an unquenchable high temperature polymorph. The cubic phase of LLZO ("c-LLZO") is the desired phase as it provides a very high Li-ion conductivity while maintaining very low electronic conductivity. A dopant, such as Al or Ga, will stabilize the cubic phase at room temperature.

Numerous methods for LLZO synthesis have been reported. The original method (see Murugan, et al., "*Fast Lithium Ion Conduction in Garnet-Type $Li_7La_3Zr_2O_{12}$*," Angewandte Chemie 46(41), pp. 7778-7781 (2007)) involves mechanical mixing of the oxides of La and Zr along with Li(OH) or $Li_2CO_3$ followed by calcination up to 1230° C. It was later determined (see GEIGER, et al., "*Crystal Chemistry and Stability of '$Li_7La_3Zr_2O_{12}$' Garnet: A Fast Lithium-Ion Conductor*," Inorganic Chemistry 50(3), pp. 1089-1097 (2011)) that during calcination, inadvertent diffusion of Al from the calcination crucibles provided Al doping that is required to stabilize the cubic form of LLZO, which is otherwise an unquenchable high temperature form of LLZO. Subsequently, Al was deliberately added to provide a controlled amount of the dopant. In all prior work, due to the high volatility of elemental Li, excess Li up to 50% is added to balance the Li loss that occurs during the high temperature calcination. An alternate method (see Jin & McGinn, "*Al-doped $Li_7La_3Zr_2O_{12}$ synthesized by a polymerized complex method*," Journal of Power Sources 196(20), pp. 8683-8687 (2011)) of LLZO production is based on the Pechini process utilizes a liquid solution of La, Al, and Li nitrates, $ZrOCl_2$ and the chelating agents ethylene glycol and citric acid. Green powder from this method is calcined at 1200° C. in order to obtain a well-crystallized c-LLZO material. Aerosol processing was first (see Yi, "*Aerosol Combustion Synthesis of Nanopowders and Processing to Functional Thin Films,*" Ph.D. Thesis, University of Michigan Horace H. Rackham School of Graduate Studies, 97 pages (2017)) demonstrated using flame spray pyrolysis ("FSP") to produce a green powder that requires calcination at 1050° C. to obtain cubic LLZO.

The scalability of prior art faces challenges due to the high temperature calcination requirement and challenge to manage the Li loss. In particular, a processing temperature below the stability of common lithium nickel manganese cobalt oxide ("NMC") cathode material phases is desirable (~800° C.) so that co-sintering of the LLZO with cathode phase powders becomes possible. By reducing the calcination temperature to below ~800° C., the issue of Li loss is largely avoided and the co-sintering with the common NMC cathode phases is enabled.

SUMMARY

At least one embodiment relates to a method comprising preparation of a combustible liquid feed of metal salts comprising lanthanum precursor, lithium precursor, zirconium precursor, and aluminum precursor with a prescribed enthalpy of combustion; combusting a spray of the combustible liquid feed at a FSP temperature; and collecting of the resulting green powder whose properties enable the formation of well crystallized c-LLZO powder at a calcination temperature of 670° C.

Another embodiment relates to a method comprising preparation of a combustible liquid feed of metal salts comprising lanthanum precursor, lithium precursor, zirconium precursor, and aluminum precursor with a enthalpy of combustion known to not produce green powder with the desired low-temperature access to c-LLZO; and combusting a spray of the combustible liquid feed in the FSP apparatus modified with flame guide to provide intensification of the combustion thereby achieving the equivalent effect of a higher enthalpy solution.

Yet another embodiment relates to a method comprising preparation of an aqueous liquid feed of metal salts comprising lanthanum precursor, lithium precursor, zirconium precursor, and aluminum precursor; processing of the aqueous solution in a spray pyrolysis apparatus completing the decomposition reactions of the precursor salts to obtain a green powder comprised of oxides of La, Zr, Al and Li(OH); and calcinating of the green powder at 700° C. to obtain well crystallized c-LLZO.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 1 show a schematic overview of aerosol processing methods for LLZO.

FIG. 2A-2B is a table showing experimental parameters for FSP experiments

FIGS. 8A-8C show the morphology of the green powder (500×, 5000×, 25000×, respectively). FIGS. 8D-8F show the morphology of the material after calcination at 800° C. for 12 hours (500×, 5000×, 25000×, respectively).

FIGS. 9A-9C show the morphology of the green powder (500×, 5000×, 25000×, respectively). FIGS. 9D-9F show the morphology of the material after calcination at 800° C. for 12 hours (500×, 5000×, 25000×, respectively).

FIGS. 10A-10F are photomicrographs of SOL40 in accordance with embodiments described herein. FIGS. 10A-10C show the morphology of the green powder (500×, 5000×, 25000×, respectively). FIGS. 10D-10F show the morphology of the material calcination at 800° C. for 12 hours (500×, 5000×, 25000×, respectively).

FIG. 18A show the green powder x-ray diffraction analysis. FIG. 18B shows the x-ray diffraction analysis after calcination at 800° C. for 48 hours. FIGS. 18C-18D are SEM of the green powder morphology. FIG. 18E is an SEM of SOL132 following calcination at 800° C. for 48 hours.

FIG. 20A show SEM of green powder.

FIG. 20B shows the x-ray diffraction analysis for the green powder. FIG. 20C shows the x-ray diffraction analysis after calcination at 800° C. for 24 hours.

DETAILED DESCRIPTION

Figure 3:
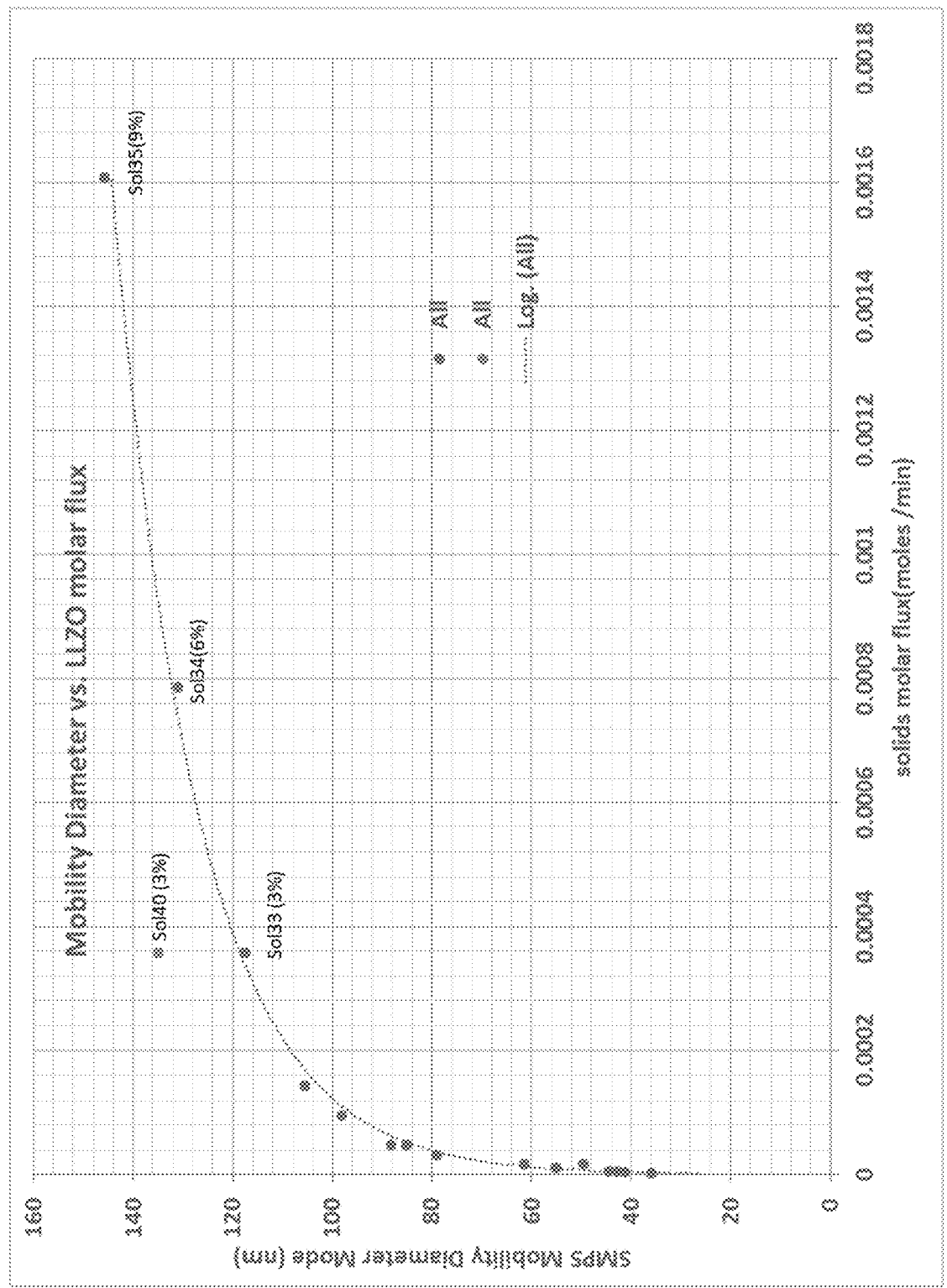
FIG. 3 is a table showing the mobility diameter as a function of LLZO molar flux for several FSP samples.
Figure 4A:
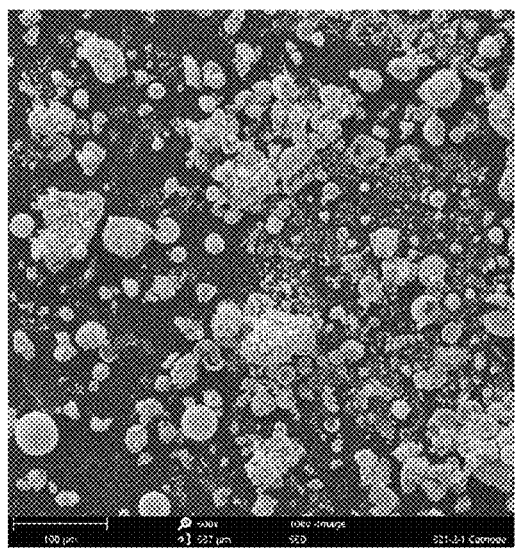
FIGS. 4A-4C show scanning electron micrographs ("SEM") illustrating the green powder morphology generated using SOL33.
Figure 4B:
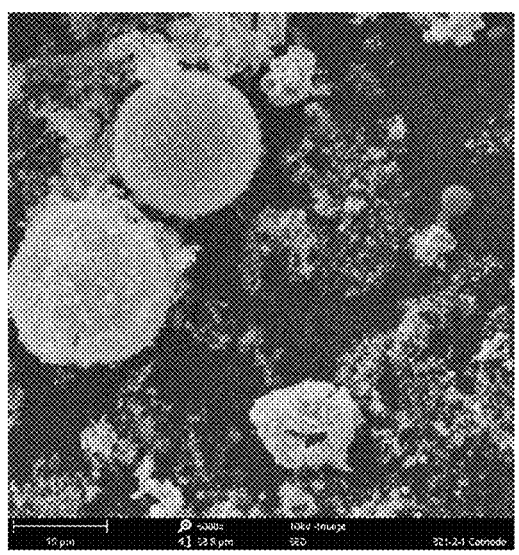
Figure 4C:
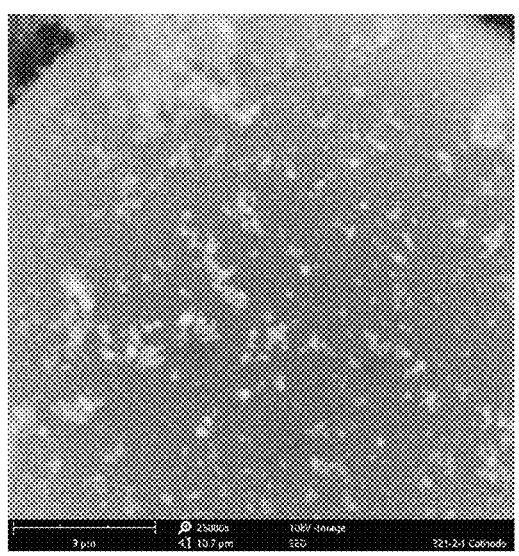
Figure 5A:
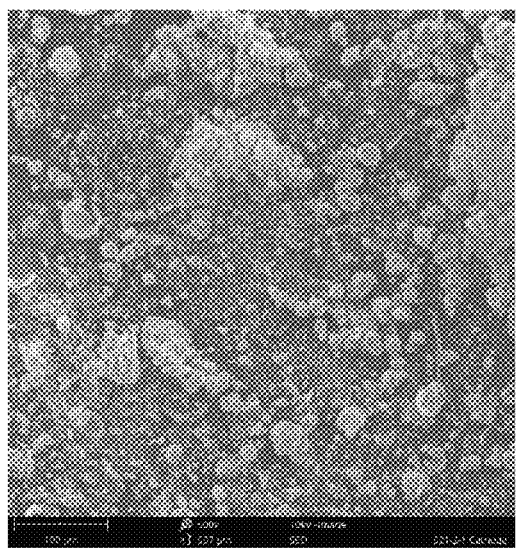
FIGS. 5A-5C are SEM illustrating the green powder morphology generated using SOL34.
Figure 5B:
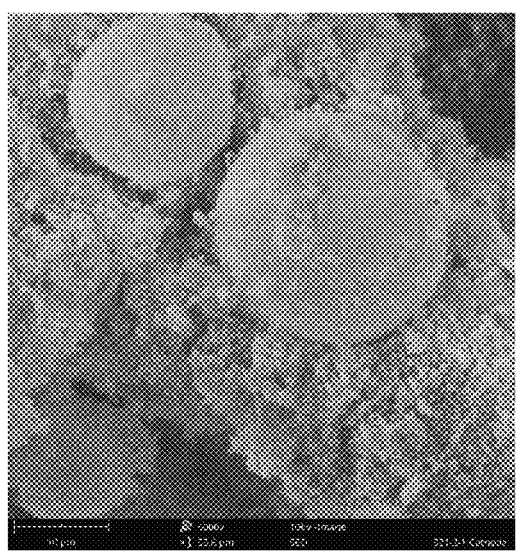
Figure 5C:
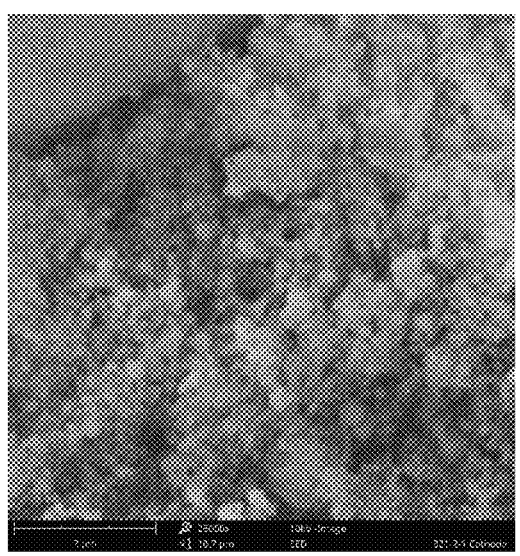
Figure 6A:
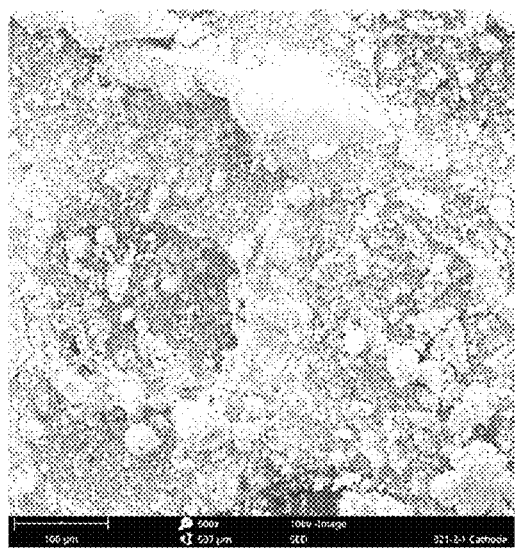
FIGS. 6A-6C are SEM illustrating the green powder morphology generated using SOL35.
Figure 6B:
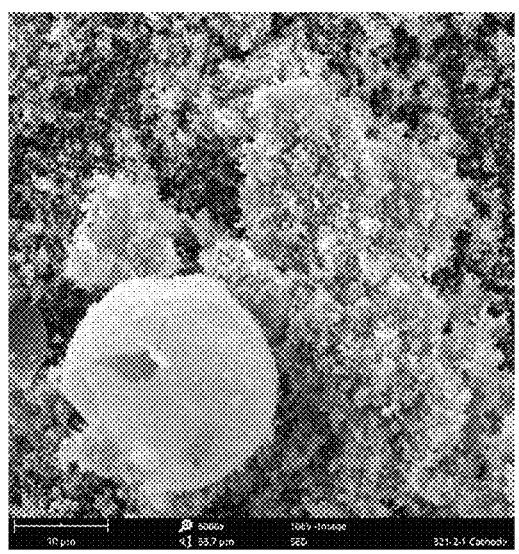
Figure 6C:
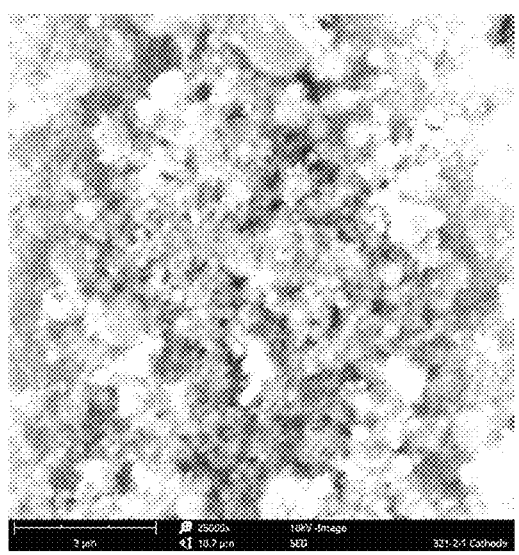
Figure 7A:
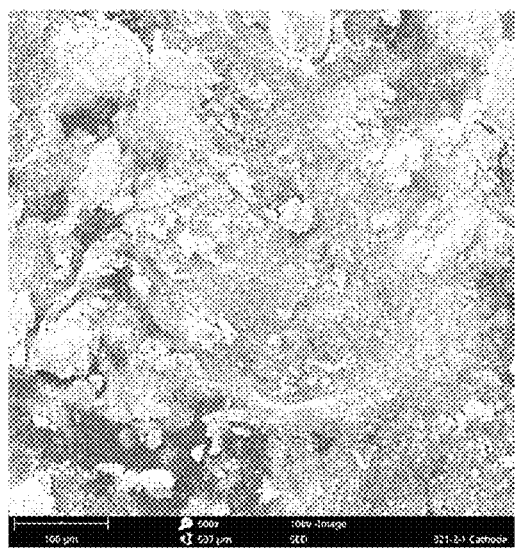
FIGS. 7A-7C are SEM illustrating the green powder morphology generated using 3% MERF Al-LLZO.
Figure 7B:
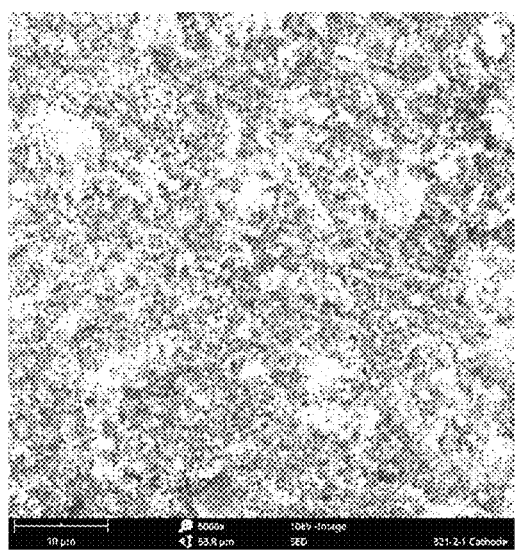
Figure 7C:
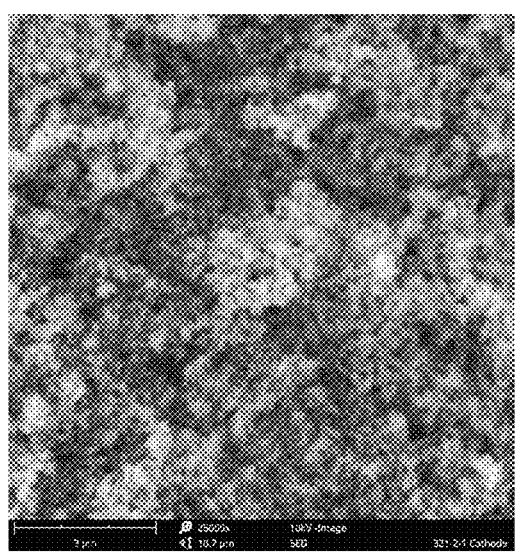

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Previously published literature suggests that at least 1000° C. is required when using the method published by Eongyu Yi (Yi, "*Aerosol Combustion Synthesis of Nanopowders and Processing to Functional Thin Films*," Ph.D. Thesis, University of Michigan Horace H. Rackham School of Graduate Studies, 97 pages (2017)) for production of c-LLZO. The published literature establishes that the cubic phase of LLZO (specifically, $Li_7La_3Zr_2O_{12}$) is the desired phase as it provides a very high Li ion conductivity while maintaining very low electronic conductivity. Thermodynamically, tetragonal is stable at low temperature and cubic is an unquenchable high temperature phase of LLZO. A dopant is used to stabilize the cubic phase to exist at room temperature. Previous work has shown that Al and Ga are successful at stabilizing the cubic phase of LLZO. Apart from the efficiency of being able to anneal at lower temperature (sub 1000° C., including sub 800° C.), a far more important feature is that the green-body particles could be co-sintered with active cathode phases, such as NMC811 or LCO, without requiring those materials to be subjected to the higher temperature (e.g., 1000° C.), which could destroy the required phase for those materials. Typically, temperatures of 750-850° C. are used to prepare the cathode phases, so LLZO cubic synthesis falling into this window would match thermal budgets for both materials. The co-sintering is a potential manufacturing strategy for making the cathode/solid-state electrolyte in an all solid-state battery.

As used herein, "sintering" refers to a process where powders (such as "green powder") is heated, below the melting point, and pressed into a solid object (powder metallurgy). "Calcination" refers to heating in the presence of air or oxygen to perform solid state reaction needed to transform green powder into the desired final product. "Green-body powders" refer to the ceramic precursor powders produced by the aerosol processes which require calcination to form the target phases, typically the powder prepared for sintering.

Figure 1:
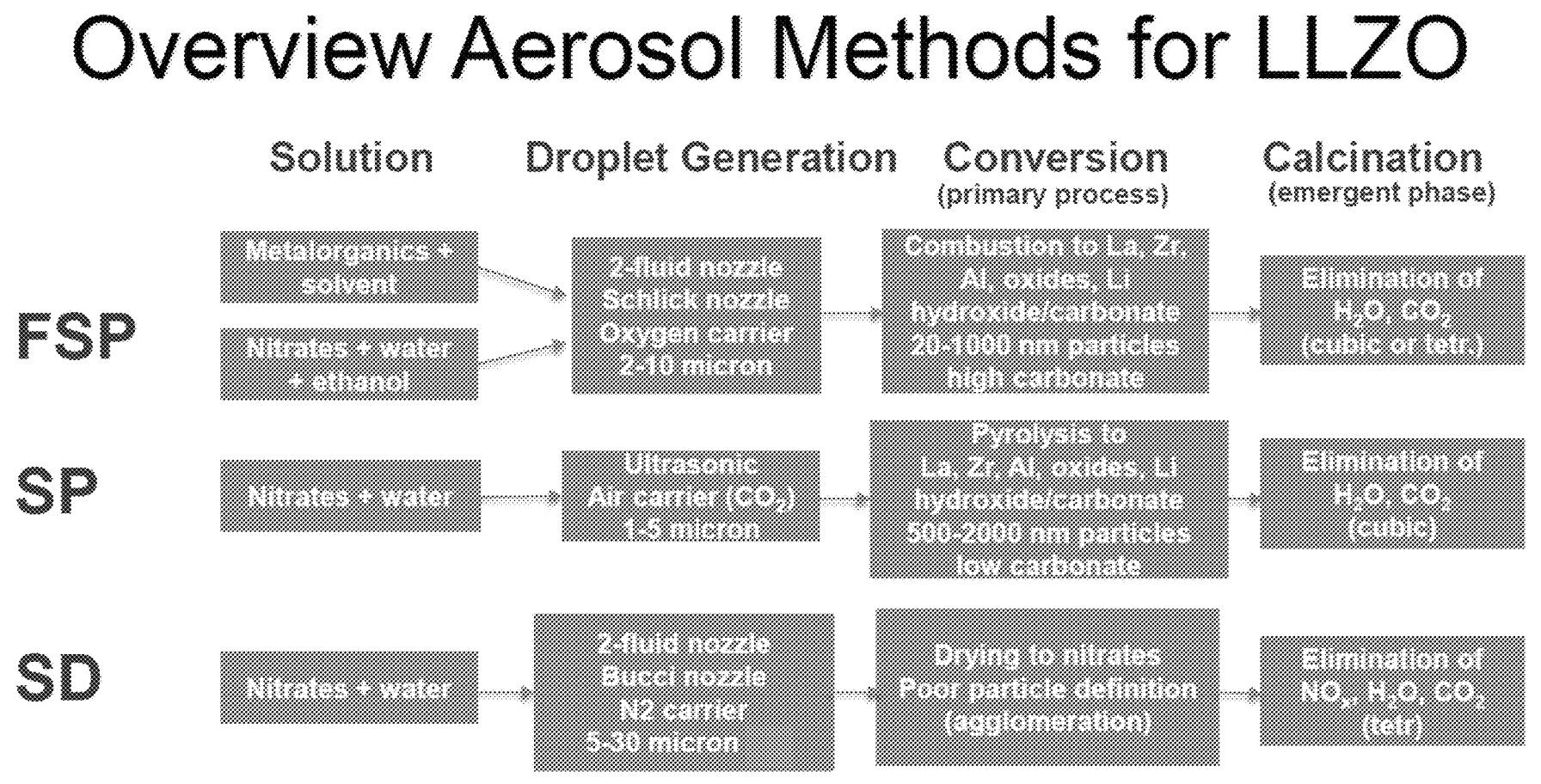

In general, the examples provided herein utilized aerosol synthesis, namely flame spray pyrolysis ("FSP"), spray pyrolysis ("SP"), and spray drying ("SD"), as shown in FIG. 1. In general, aerosol processes start with liquid solution of the precursor element. The liquid solution includes solvent and atomically mixed precursors. During aerosol processing, liquid droplets are generated. The liquid transformed into solid particles that may or may not be comprised of a single phase or "atomically mixed" state depending on the parameters of the aerosol process. In some embodiments, the aerosol process parameters are selected to provide atomically mixed solid particles as a pathway to cubic-LLZO at low temperature. In one embodiment, the low temperature for the emergence of c-LLZO is below 1000° C.; in a further embodiment, it is below 900° C. The lower end of the calcination temperature is the minimum temperature to achieve cubic phase (i.e., the temperature at which the cubic phase of the LLZO emerges). In one embodiment, the process results in emergence of the cubic phase at 670° C. for FSP and at 650° C. for SP. The upper bound of the temperature range may be selected relating to the desired material properties, such as crystal quality, grain size, and calcination time. However, the upper range also has negative associates such as with the described prior processes where additional lithium must be added. Therefore, a desirable upper range bound is 900-1000° C.

The aerosol processes utilize a dopant material. In one embodiment, dopant is selected from Al, Ga, Ta, and Ba. In one embodiment, the aerosol processes utilize an aluminum dopant and result in a material having the nominal formula $Li_{(7-3x)}La_2Zr_3O_7Al_x$ where x=0.25 is the nominal optimum and upon which are research is based; in certain embodiments, x=0.19-0.389. Note that data with both tetragonal and cubic phases present after and 800° C. calcination that supports the partitioning of Al. The activation energy of the dopant may impact the amount of atomic mixing that results.

In the FSP process, a combustible liquid feed containing metal salt is atomized (turned into droplet dispersion) by a gas-assisted spray nozzle. The spray is ignited by a flame, such as methane-oxygen pilot flames. The FSP process ideally utilizes flame that is continuously maintained to assure continuous combustion that also incidentally provides additional heat energy to the products of the spray combustion. Optionally, another embodiment uses a confining ceramic tube as a flame guide and provides a radiation shield that helps maintain a higher sustained flame temperature. Similar to the higher enthalpy solution (such as due to the solvent selection) resulting in an increased flame temperature in the FSP process and achieving atomic mixing, the use of a flame tube or guide provides higher boundary temperature, achieving the desired atomic mixing as seen in one experiment example described herein.

In the SP process, a non-combustible liquid feed is atomized and transported by carrier gas through a high temperature reaction zone. It has been found that either the FSP process or the SP process can be tuned to obtain atomically mixed green powders. These atomically mixed green powders can be calcined to attain the cubic-LLZO phase at lower calcination temperature than previously reported and as understood previously for general green powder resulting from LLZO formation.

SD can also be utilized as the aerosol method for formation of c-LLZO. In SD, a non-combustible liquid feed is atomized and transported by carrier gas through a low temperature drying zone.

The amount of precursor and dopant loaded into the solution prior to the formation of the green powder may vary depending on the selected aerosol process and the other selected process criteria. For example, the loading may be 3-9%. Loading is the ceramic loading (i.e., the percentage of solution weight that converts into thee solid product).

In various embodiments, aerosol technologies are optimized to deliver particles with tunable mixing extent in the green-body particles by controlling the solution composition or reaction processing temperature, as illustrated in FIG. 1. The range of the reaction/processing temperature for the primary conversion of the droplets represents from 700-1800° C. The reaction temperature can reach 1800° C. in the combustion processes by using the high-enthalpy solvents. As a result, the conversion temperature of c-LLZO decreases from over 1000° C. for the green-body powders collected from spray drying to 700° C. for the green-body powders obtained from FSP processes.

Experiments were performed as detailed further below. One set of experiments utilized aerosol process recipes as shown below.

TABLE 1

Aerosol process recipes.

| | Combustion | Ultrasonic Spray Pyrolysis | Spray Drying |
|---|---|---|---|
| Salts | Organometallic | Nitrate | Nitrate |
| Solvent | Xylene and 2-ethylhexanoic acid | Ethanol | Water |
| Mass loading (g salts/L solution) | 142 | 95 | 159 |
| Li:La:Zr:Al (molar) in feed solution | 9.4:3:2:0.25 | 9:3:2:0.25 | 7:3:2:0.25 |

TABLE 1-continued

Aerosol process recipes.

| | Combustion | Ultrasonic Spray Pyrolysis | Spray Drying |
|---|---|---|---|
| La:Zr:Al (molar) in products | 2.7:2:0.22 | 3:2:0.24 | 3:2:0.25 |
| Particle formation pathway | Gas-to-particle | | Droplet-to-particle |

Flame Spray Pyrolysis

For FSP, a green powder material is prepared comprised of the precursor materials for Al-doped LLZO, lanthanum, lithium, zirconium and aluminum. As an alternate chemistry to this prior art path to LLZOs, described herein are methods and compositions based on ethylhexanoic salts of lanthanum, lithium, and zirconium may be utilized. The powdered material may further include dopants, such as aluminum. The dopant is preferably selected to aid in the emergence of the c-LLZO structure at lower temperatures than without the dopant, such as by facilitating atomic mixing of the components. In one embodiment, solvents for the FSP process are selected to be high enthalpy solvents.

High enthalpy solvents may be selected for their compatibility with the aerosol process, such as flammability for FSP, as well as for their compatibility with precursors for the metals. For example, the solvent's viscosity may be negatively associated with the process (higher viscosity resulting in lower levels of atomic mixing.

As used herein, atomically mixed means the dopant (e.g., Al) and metals (e.g., La and Zr) are uniformly distributed. Atomically mixed solid particles (such as following initial conversion via FSP, SP or SD) have uniform distribution of the dopant and metals in the particles. The atomically mixed green powder is disposed to form the cubic phase LLZO at a low temperature (<1000° C.). This is in contrast to the situation where the dopant, such as Al, exists as separate particles whereby a high temperature (>1000° C.) is required to allow alumina breakdown and incorporation into the LLZO by diffusion during calcination. As described below, in one embodiment these methods and compositions can utilize alumatrane as an aluminum (dopant) source. Embodiments herein relate to combustion synthesis of aluminum doped lithium lanthanum zirconium oxide with annealing onset of cubic LLZO at 700° C. In contrast to the prior art methods, in the embodiments described herein, the cubic phase of the LLZO was observed to form at temperatures as low as 700° C. The resultant LLZO may be doped with the dopant included with the metal salt.

It is believed that the FSP parameters may be adjusted to produce a volcano-like optimum where the results begin to revert to higher and higher amounts of segregated phases of LLZO. For example, the experiments described herein include results showing the "breaking" of the desired result of c-LLZO at sub 1000° C. temperatures by altering parameters of the process, such as in SOL40, by doubling the solute concentration. It is believed that this results in the retardation of solute combustion so that the metal atoms/molecule sample a much wider range of flame conditions.

The FSP process may utilize a range of precursors. The precursors should be those deployable as atomizable solutions and the resultant solution must be compostable in the flame and, preferable, provide a stable efficient flame (pyrolysis). In particular, the precursors (and dopant) should be soluable at the 2-10% ceramic yield level.

In one embodiment, the FSP proceeds with a nozzle selected to achieve the atomic mixing. In the experimental examples described herein, the nozzle was a SHLICK MOD. 970 S 8 D4.1016/1. This is a two-fluid nozzle where fluid one is gaseous oxygen at a typical flow of 10 LPM and fluid two is the liquid solution at a corresponding flow of 8 mL/min. Additional gaseous oxygen at 25 LPM is provided as "sheath" oxygen is provided to complete combustion oxidizer needs. The burner design is one based on burners described by Pratsinis and others using an axisymmetric radial nesting of the atomized liquid, sheath flow, pilot flame array and finally quench gas nitrogen. The choice of 8 ml/min and 10 LPM flow rates are based on a starting point of the manufacturers operating instructions. It should be appreciated that these numbers may be and then optimized using combustion characteristics, primarily qualitative evaluation of flame stability and brightness indicating efficient combustion, for a particular FSP device and its operating environment. Rather than having the atomized flow be detached from pilot torch so that their combustion only starts at the point of convergence of the spray and pilots, the FSP setup used for the described experiments maintains a combusting spray which could potentially operate without pilot flame support.

Described further below are experiments using various materials prepared according to the designated methods. "SOLXX" refers to precursor solution XX as it was combusted in accordance with standard procedures. Note, for the samples indicated as following prior art protocol, the prior work indicated solutes were to be dissolved into pure ethanol however such as not found to occur, so organic acids were utilized to achieve dissolution and a clear solution. The precursor solutions are mixtures of metal salts and flammable solvents that are combusted in the FSP.

SOL33, 34, and 35 are solution formulations based on the thesis work of Eongyu Yi, which provides a reference synthesis. It should be noted that samples made from SOL33-35 provide a standard basis for comparison as these materials produced by the prior method of Yi were produced in the same facility as examples of methods described herein. One such method was utilized in the experiments utilizing SOL40. SOL40 is believed to be cheaper to make and easier to burn than prior methods such as those of Yi. SOL40 is based on ethylhexanoic acid salts of Lanthanum, Lithium, and Zirconium, along with alumatrane as the Al source.

SOL38 is a variant of SOL33 wherein the solvent was comprised of 50% propionic acid and 50% ethanol in contrast to 90% ethanol and 10% acetic acid used in SOL33. The solutes and their concentrations were same. Thus, SOL38 represents a higher enthalpy version of SOL33. The calcination of SOL38 green powder at 800° C. yielded cubic-LLZO.

During combustion synthesis, the TSI Scanning Mobility Particle Sizer was used to measure the primary particle size. These data are shown in FIG. 3 and Table 2, which illustrates the mobility diameter as a function of LLZO molar flux for several samples. SOL33-35 were prepared in accordance with the prior art methods, while SOL40 is based on an embodiment as described herein with ethylhexanoic acid complexation. It is noteworthy that certain embodiments, such as SOL40, show a larger SMPS particle size while a smaller BET derived particle size than prior art approaches, such as reflected in SOL33. This suggests that the SOL 40 material has some aggregate nature. This is consistent with high-temperature operations leading to primary particle sintering. A higher flame temperature provides opportunity for the individual primary particles to sinter.

TABLE 2

Mobility diameter as a function of LLZO molar flux.

|  | BET SA($m^2/g$) | d(nm) based on 5 g/cc |
|---|---|---|
| SOL26 | 10.4 | 115 |
| SOL33 | 11.1 | 109 |
| SOL34 | 7.2 | 167 |
| SOL35 | 5.8 | 207 |
| SOL40 | 13.1 | 92 |

Table 3 shows weight loss during annealing for SOL26, 33-35, and 40. This weight loss is due to the conversion of $Li_2CO_3$ into $CO_2$ and LiO incorporation into LZO to form LLZO. The theoretical weight loss is also shown, calculated to be 24%. The prior art method (SOL26, 33-35) closely follows the theoretical weight loss assuming all Li is in the $LiCO_3$ form. However, as can be seen in the data, one embodiment, SOL40, falls short of the expected weight loss, possibly due to other forms of Li.

TABLE 3

Weight loss during annealing for SOL26, 33-35, and 40.

|  | Yi Prior Art | | | | MERF |
|---|---|---|---|---|---|
|  | SOL26 | SOL33 | SOL34 | SOL35 | SOL40 |
| 700° C. annealing weight loss | 12% | 16% | 12% | 8% | 7% |
| 800° C. annealing weight loss | 24% | 30% | 24% | 24% | 16% |
| Theoretical weight loss $Li_2CO_3 = Li_2O + CO_2$ | 24% | 24% | 24% | 24% | 24% |

FIGS. 4A-7C compare by SEM the morphology of green powders for sample created by FSP using solutions SOL33, SOL34, SOL35, and SOL40 respectively. The particle size by SEM matches the SMPS and BET particle size. During FSP, the atomization of the liquid feed produces a range of liquid droplet sizes typically reported to be in the 1-10 micron size range which is within specification for the two-fluid nozzle used in the ANL FSP facility. In ideal FSP operation, the droplets are fully vaporized and all solvent and solute is converted to the gas phase prior to any formation of solid phase particles. This is the droplet-gas-particle mode. In contrast, it is possible for the liquid droplets to return their structure during evaporation of solvent and simultaneous combustion such that the droplet morphology is retained in the collected green powder, the so called droplet to particle mode. This mode is referred to as flame assisted spray pyrolysis ("FASP") as the solutes go through the stages solute-dried particle-solid state reacted particle. In FSP it is solute-atoms/molecules-condensed particle. FASP may be viewed as a hybrid mode of FSP and SP. One configuration is to spray an aqueous solution into a flame wall. In the experiments described below, SOL127 the flame comes evaporating solvent only since the solutes are not flammable. The tell-tall sign of FASP or SP is that the liquid droplet morphology is generally preserved. That is why RST112 and SOL127 green powders look similar—spheres in the micron sized range as opposed to nanopowders.

In general, hollow spheres indicated a droplet-particle synthesis pathway. In this case, the droplets diminish in size by solvent evaporation and solute precipitation, often leaving a shell of precipitant which then undergoes pyrolysis in a hot environment. Frequently, both modes are observed. The SOL33-35 samples show primarily gas-to-particle mode combustion with some lesser indication of droplet-to-particle mode. These are notably absent in SOL40 consistent with the higher temperature flame which promotes total vaporization and suppresses the droplet-to-particle morphology. These SOL33-35 materials utilized acetic acid and water mixed with ethanol to achieve the clear solutions.

Figures 8A, 8B, 8C:
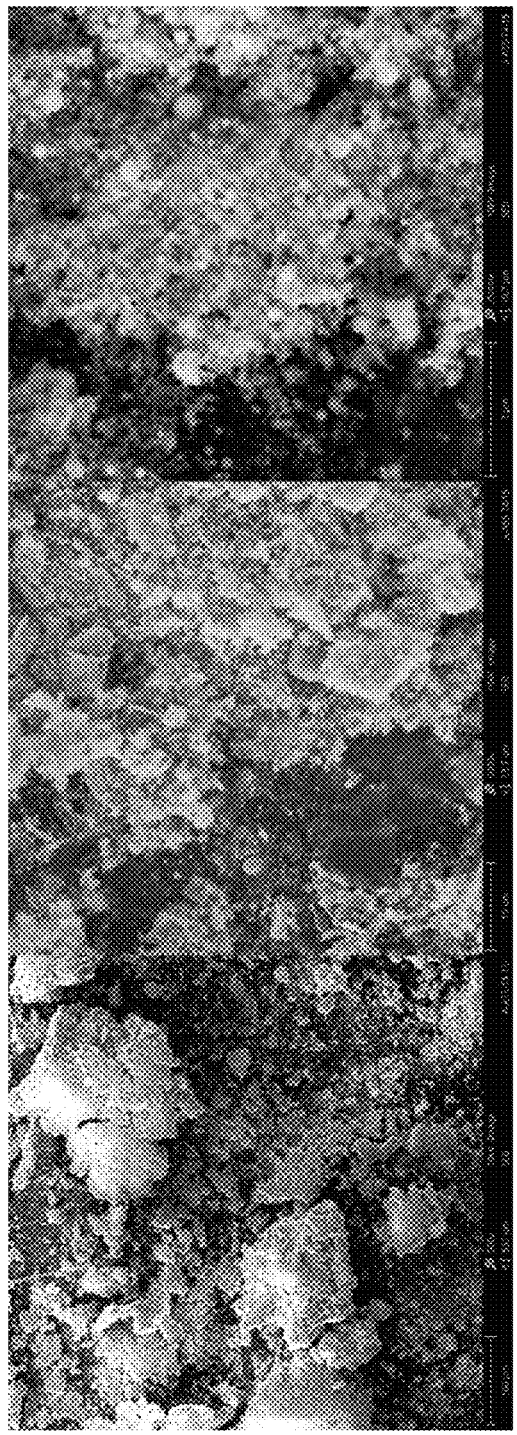
FIGS. 8A-8F are photomicrographs of SOL26.
Figures 8D, 8E, 8F:
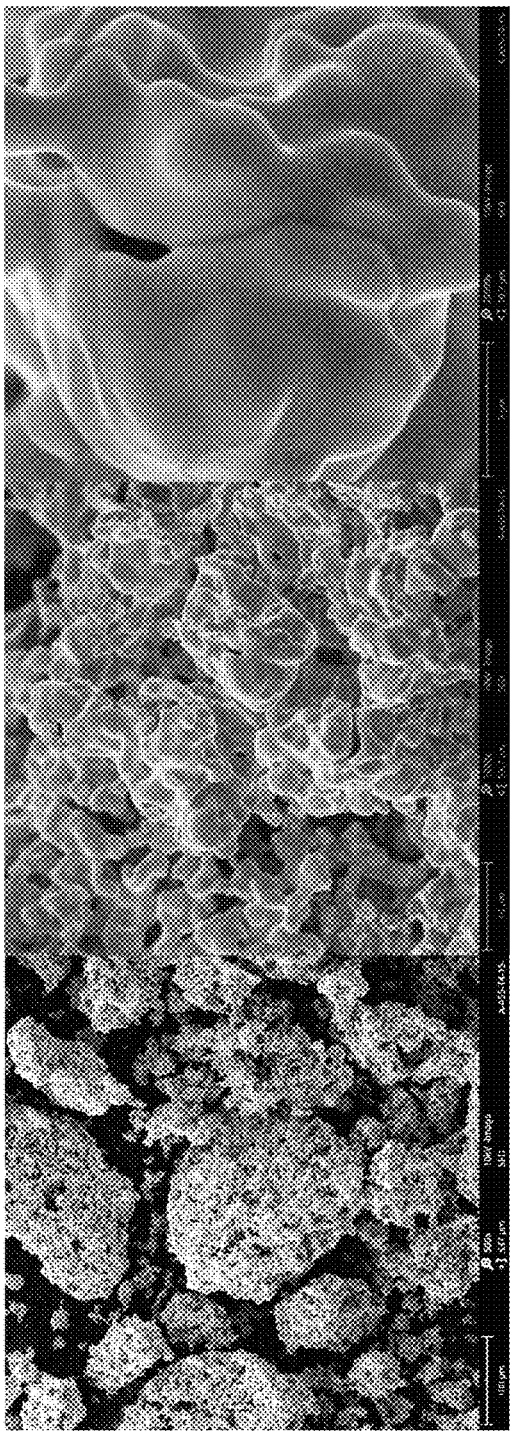

FIGS. 8A-8F are photomicrographs of SOL26. FIGS. 8A-8C show the morphology of the green powder (500×, 5000×, 25000×, respectively). FIGS. 8D-8F show the morphology of the material after calcination at 800° C. for 12 hours (500×, 5000×, 25000×, respectively).

Figures 9A, 9B, 9C:
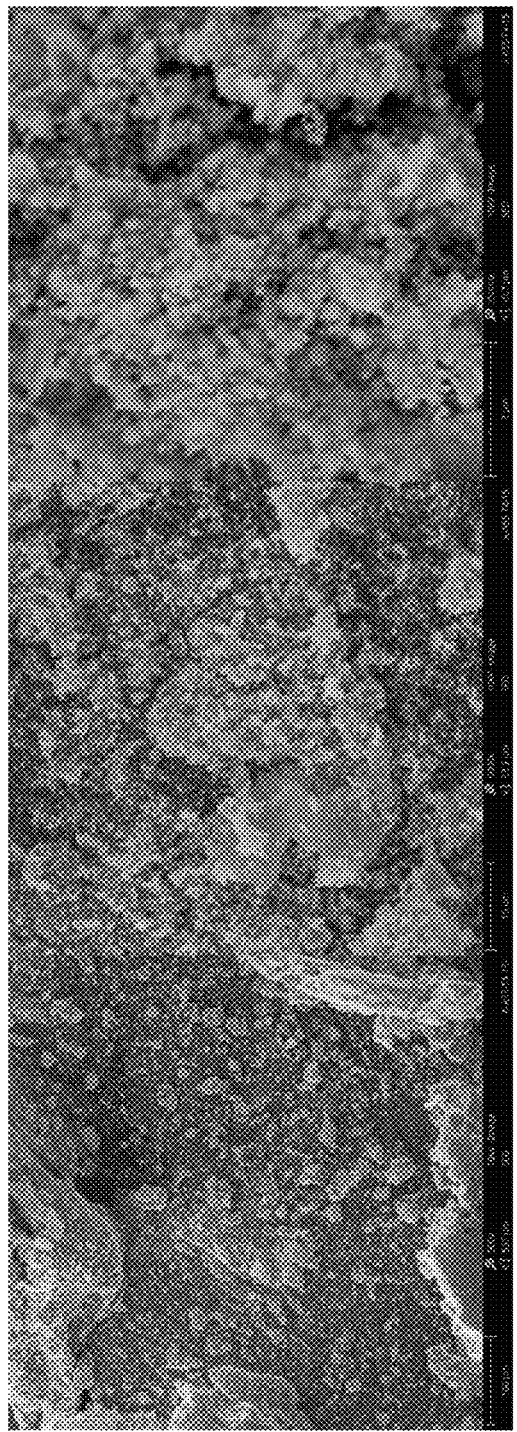
FIGS. 9A-9F are photomicrographs of SOL35.
Figures 9D, 9E, 9F:
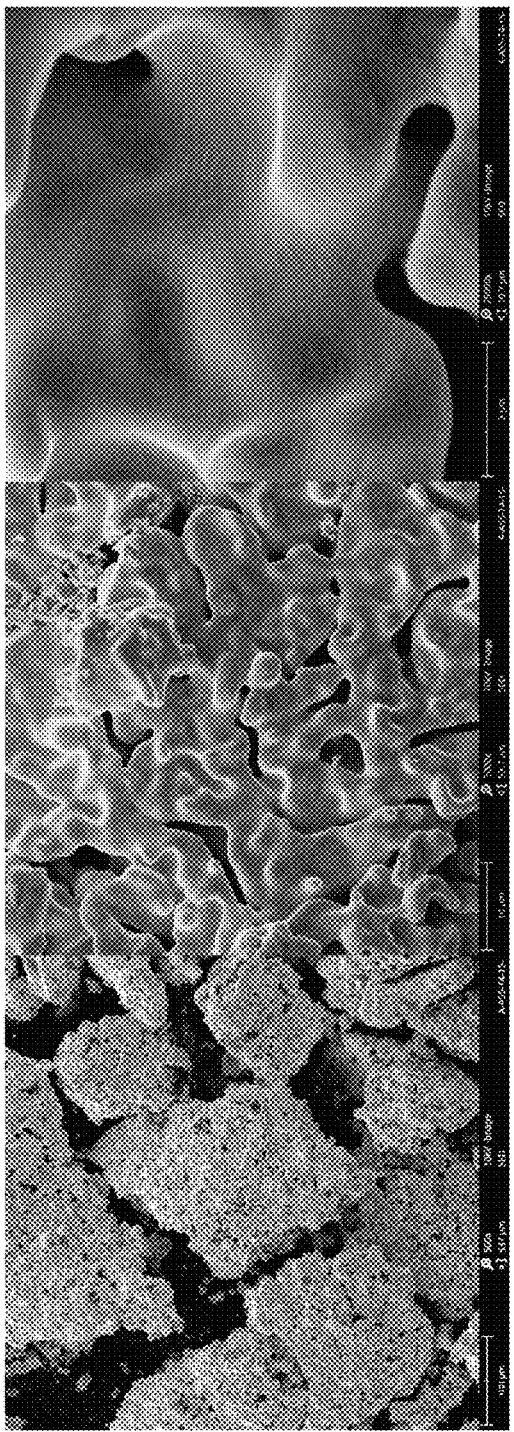

FIGS. 9A-9F are photomicrographs of SOL35. FIGS. 9A-9C show the morphology of the green powder (500×, 5000×, 25000×, respectively). FIGS. 9D-9F show the morphology of the material after calcination at 800° C. for 12 hours (500×, 5000×, 25000×, respectively).

FIGS. 10A-10F are photomicrographs of SOL40 in accordance with embodiments described herein. FIGS. 10A-10C show the morphology of the green powder (500×, 5000×, 25000×, respectively). FIGS. 10D-10F show the morphology of the material calcination at 800° C. for 12 hours (500×, 5000×, 25000×, respectively).

FIGS. 9A-9F and FIGS. 10A-10F compare the annealing effect on morphology for SOL35 and SOL40. Note that in both cases a similar fusion of the nano-phase occurs and a resulting semi-continuous phase of micron sized features results.

Figure 11:
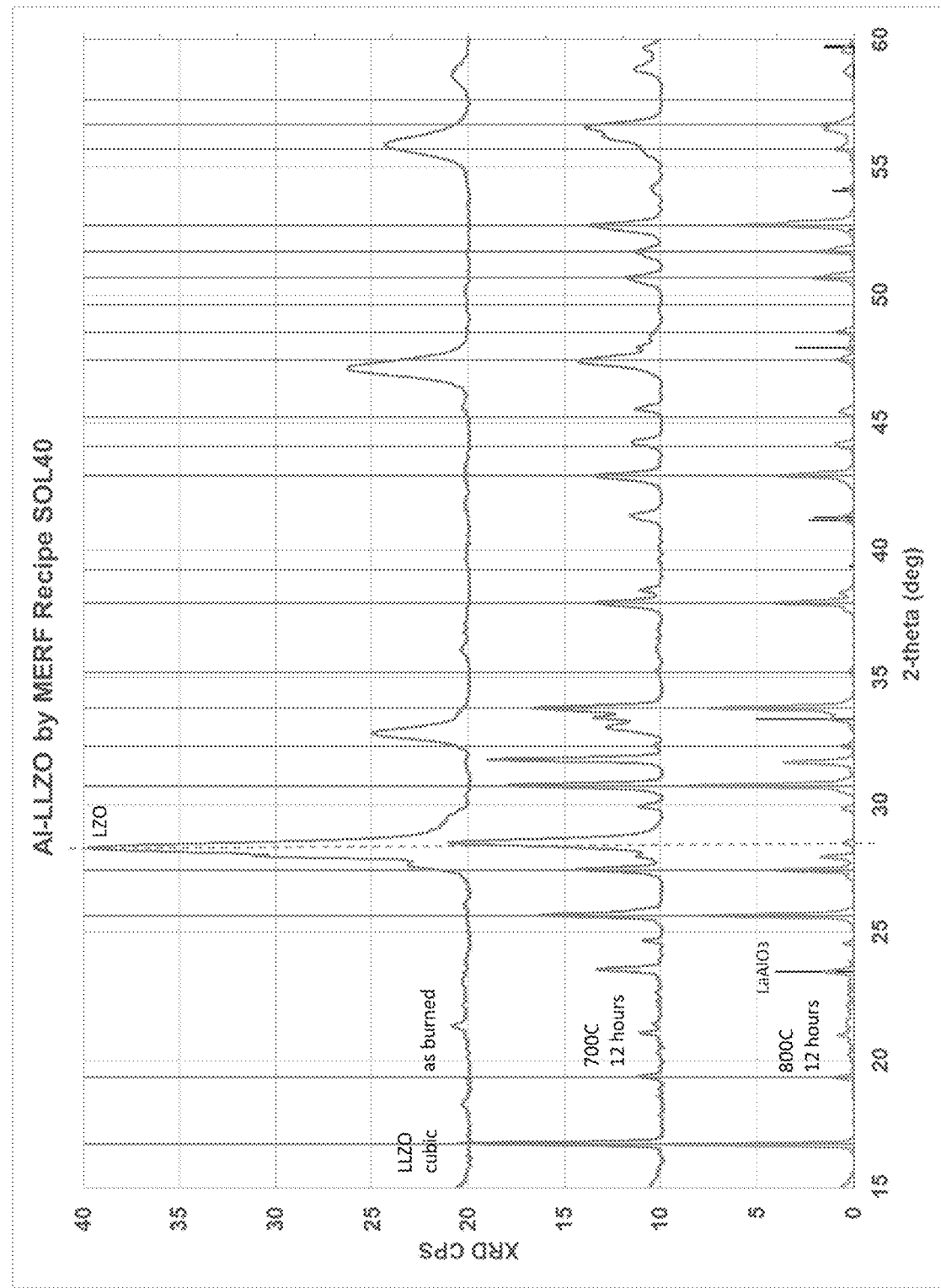
FIG. 11 shows x-ray diffraction analysis for SOL40.

FIG. 11 shows x-ray diffraction analysis for SOL40 (74.87% vol xylene, 25.13% vol octoic acid, 43.96 mg/ml Li-octoate, 3.14 mg/ml alumatrane, 53.26 mg/ml La-octoate, 41.47 mg/ml Zr-octoate).

Figure 12:
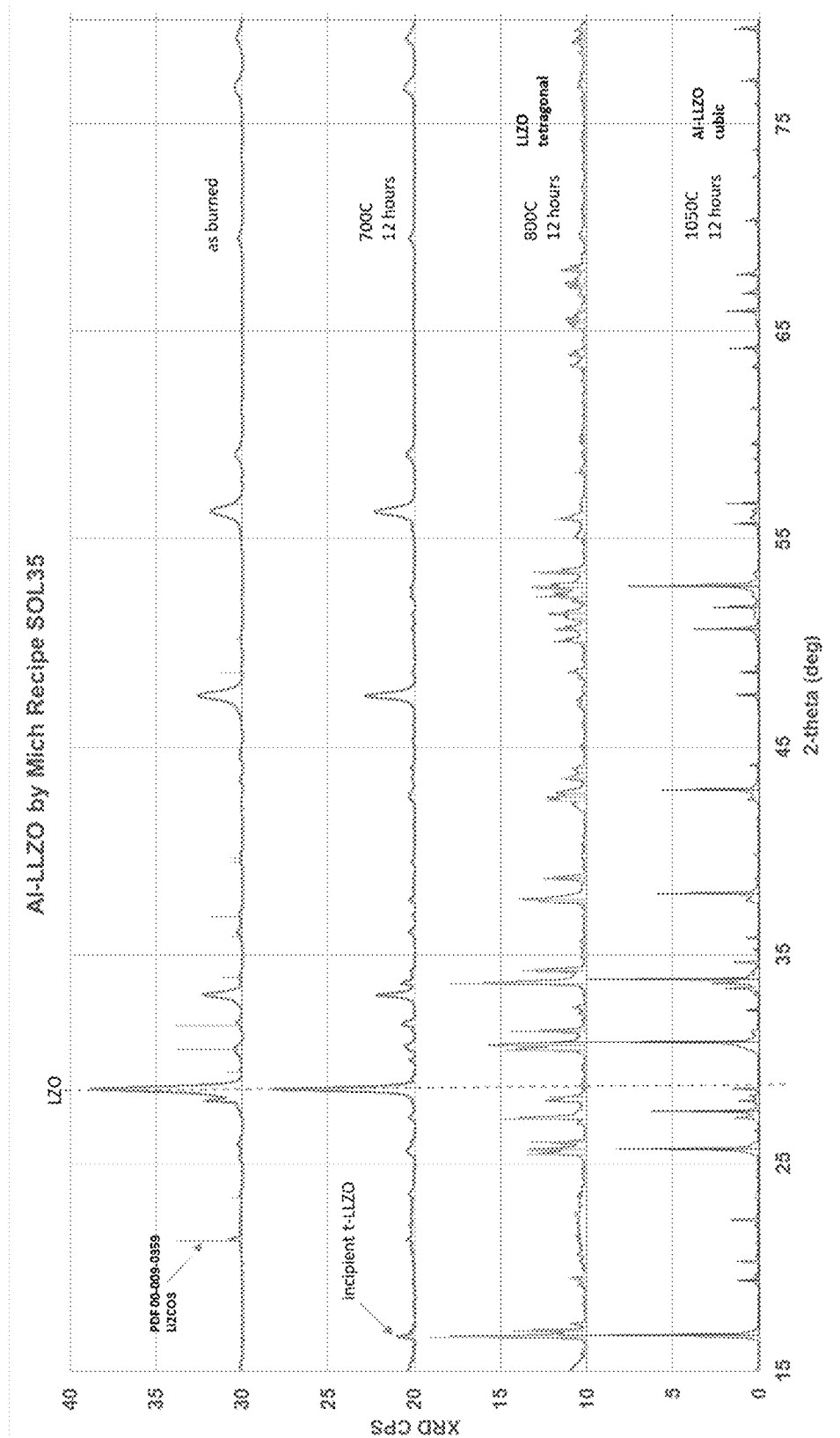
FIG. 12 shows x-ray diffraction analysis for SOL35.

FIG. 12 shows x-ray diffraction analysis for SOL35. Comparing FIG. 11 and FIG. 12 shows the phase behavior of SOL35 upon annealing at various conditions relative to the embodiment in SOL40. At 800° C., there is no formation of the cubic phase. At 1050° C., the cubic phase is observed consistent with published work. FIG. 12 further establishes that the LLZO cubic phase is contracted leading to upshifted XRD peaks.

Figure 13:
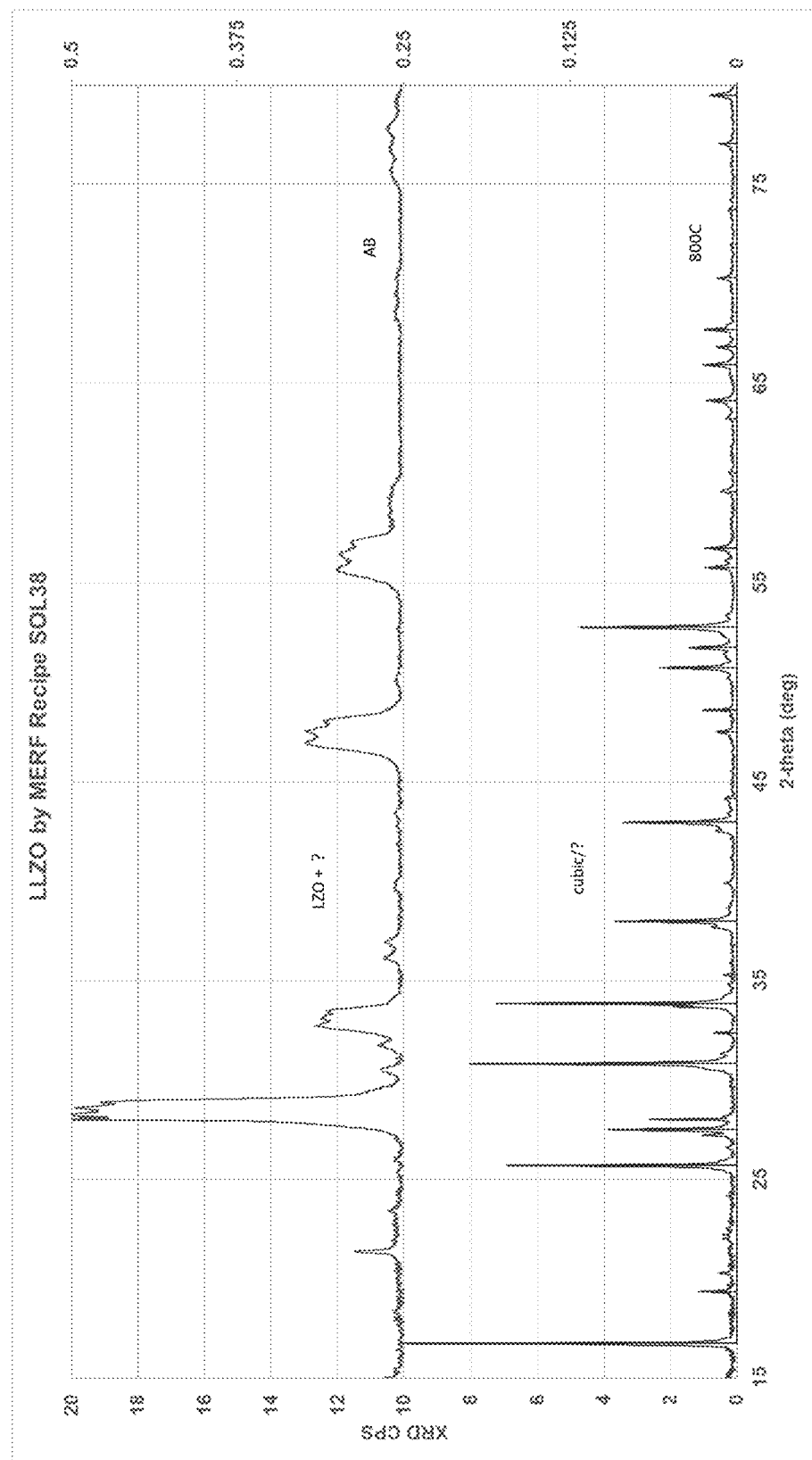
FIG. 13 shows x-ray diffraction analysis for SOL38.

FIG. 13 shows x-ray diffraction analysis for SOL38 (3% solids, 49.00% vol ethyl alcohol ("EtOH"), 50.00% vol, propionic acid, 1.00% vol water, 21.17 mg/ml Li propionate, 33.88 mg/ml La isobutyrate ("IBR"), 16.88 mg/ml Zr IBR, 2.73 mg/ml alumatrane).

Figure 14:
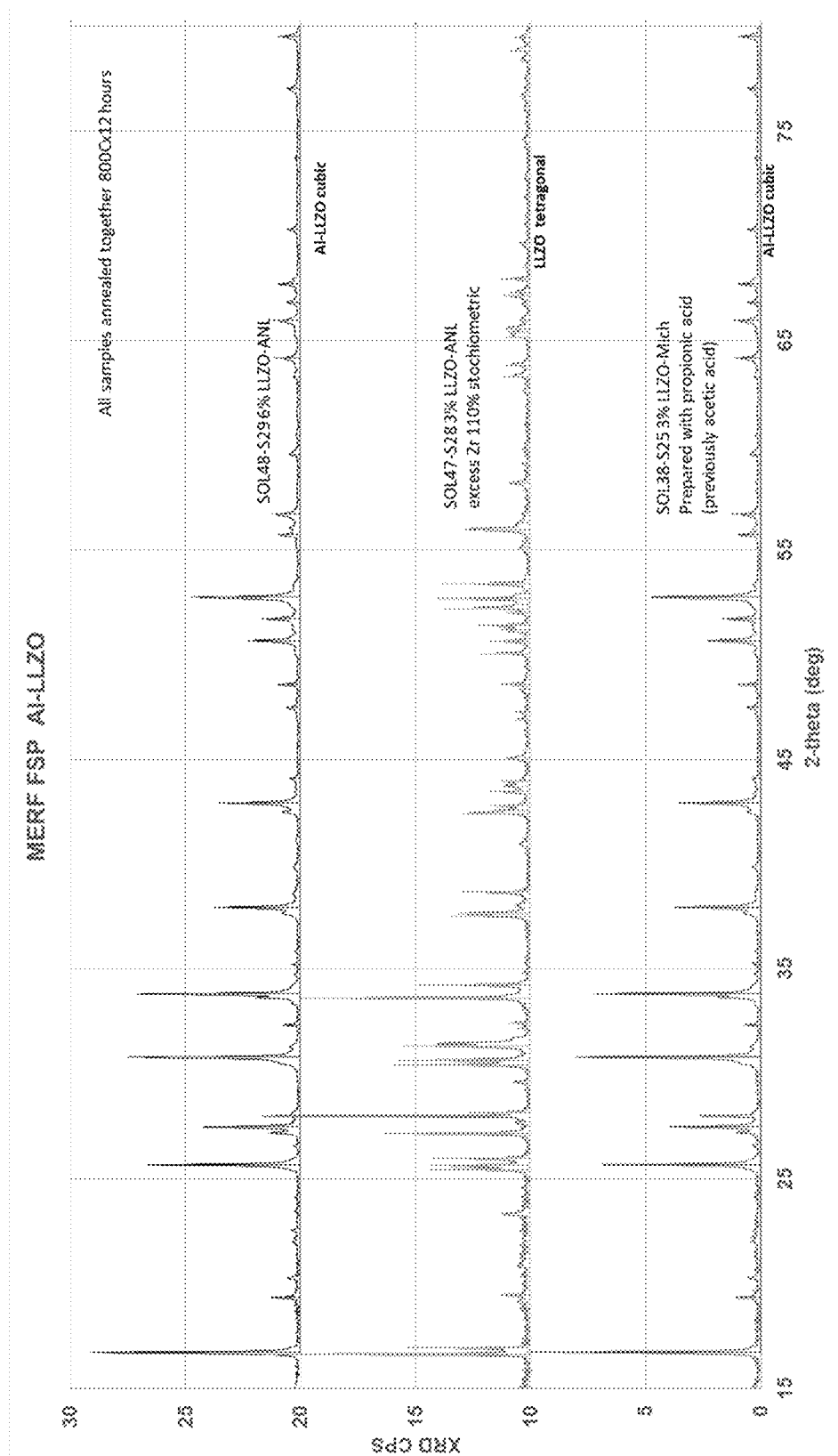
FIG. 14 shows x-ray diffraction analysis for SOL48.

FIG. 14 shows a comparison of SOL48 (6% LLZO as described herein), SOL47 (3% LLZO as described herein), and SOL38 (3% prior art LLZO prepared with propionic acid) by x-ray diffraction analysis, all samples annealed for 12 hours at 800° C. The use of propionic acid does two things: (a) it enabled an easier route to clear solutions with good combustion properties for burning and (b) it provided a hotter flame. This demonstrates the high temperature during the conversion of the droplet provides the pathway for formation of c-LLZO at a lower temperature than previously accomplished.

Figure 15:
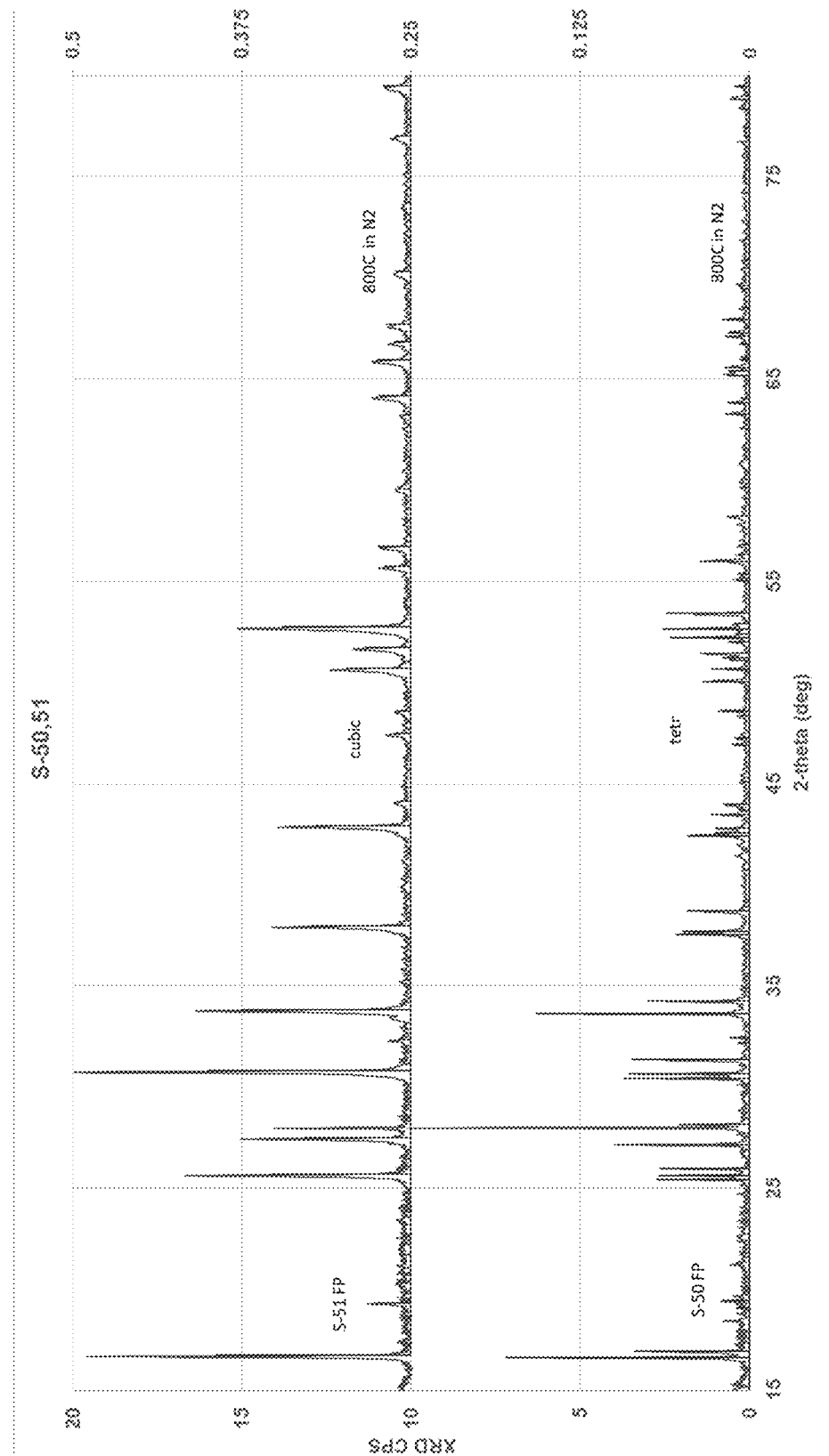
FIG. 15 shows x-ray diffraction analysis for SOL50.

FIG. 15 shows a comparison of SOL50 (3% CL, 74.87% vol Xylene, 25.13% vol octoic acid, 43.96 mg/ml Li-octoate, 3.14 mg/ml alumatrane, 53.26 mg/ml La-octoate, 41.47 mg/ml Zr-octoate as described herein), SOL51 (3% CL, 50.00% vol xylene, 50.00% vol propionic acid, 21.17 mg/ml Li propionate, 33.88 mg/l La IBR, 16.88 mg/ml Zr IBR, 2.73 mg/ml alumatrane), all samples annealed for 12 hours at 800° C.

Figure 16:
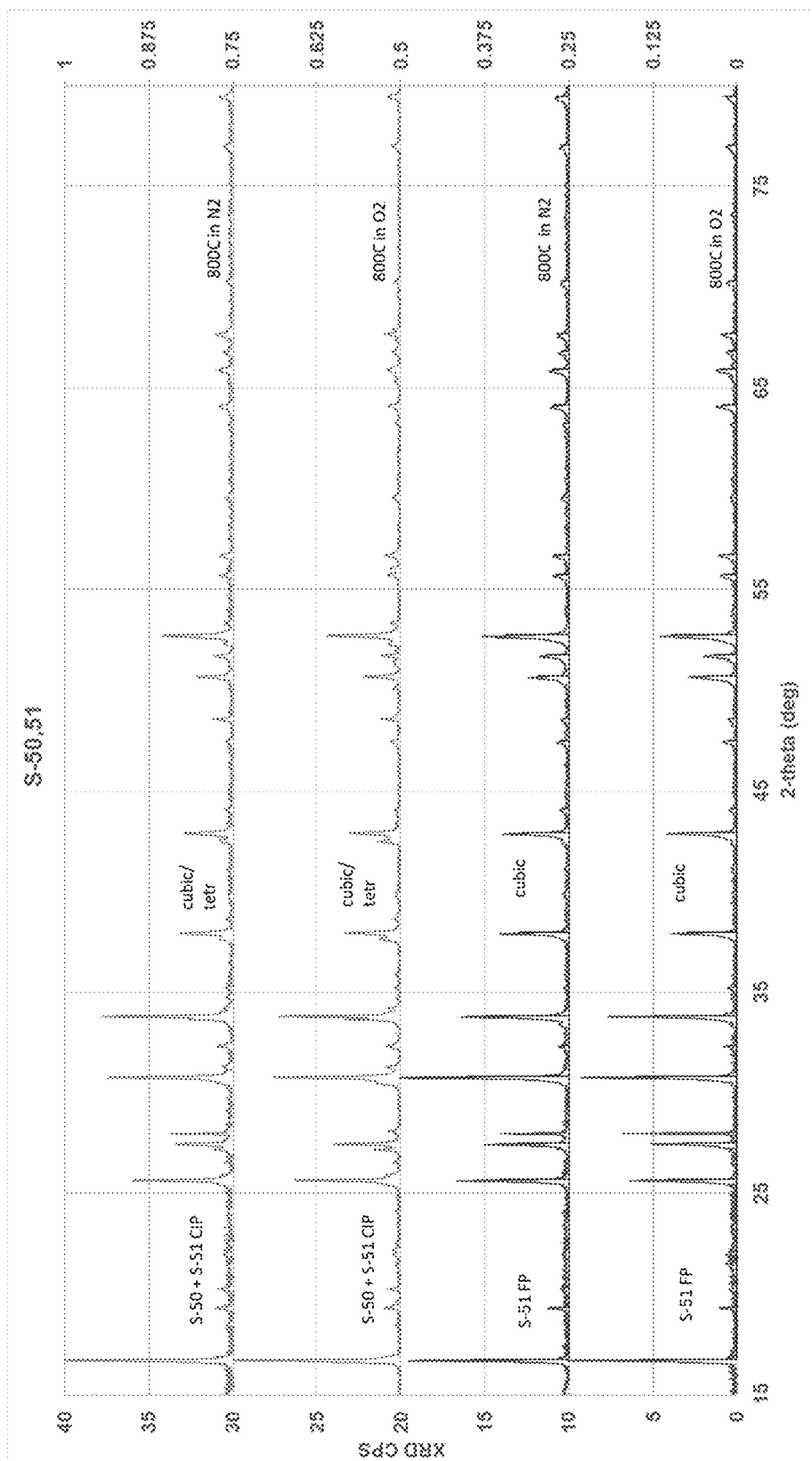
FIG. 16 shows x-ray diffraction analysis for four samples: SOL50+S-51CIP, SOL50+S51CIP, SOL51 FP, and SOL51 FP.

FIG. 16 shows x-ray diffraction analysis for four samples consisting of SOL50+S-51CIP annealed in a nitrogen environment, SOL50+S51CIP annealed in an oxygen environment, SOL51 FP annealed in a nitrogen environment, and SOL51 FP annealed in an oxygen environment. All samples were annealed at 800° C. for 12 hours.

Figure 17A:
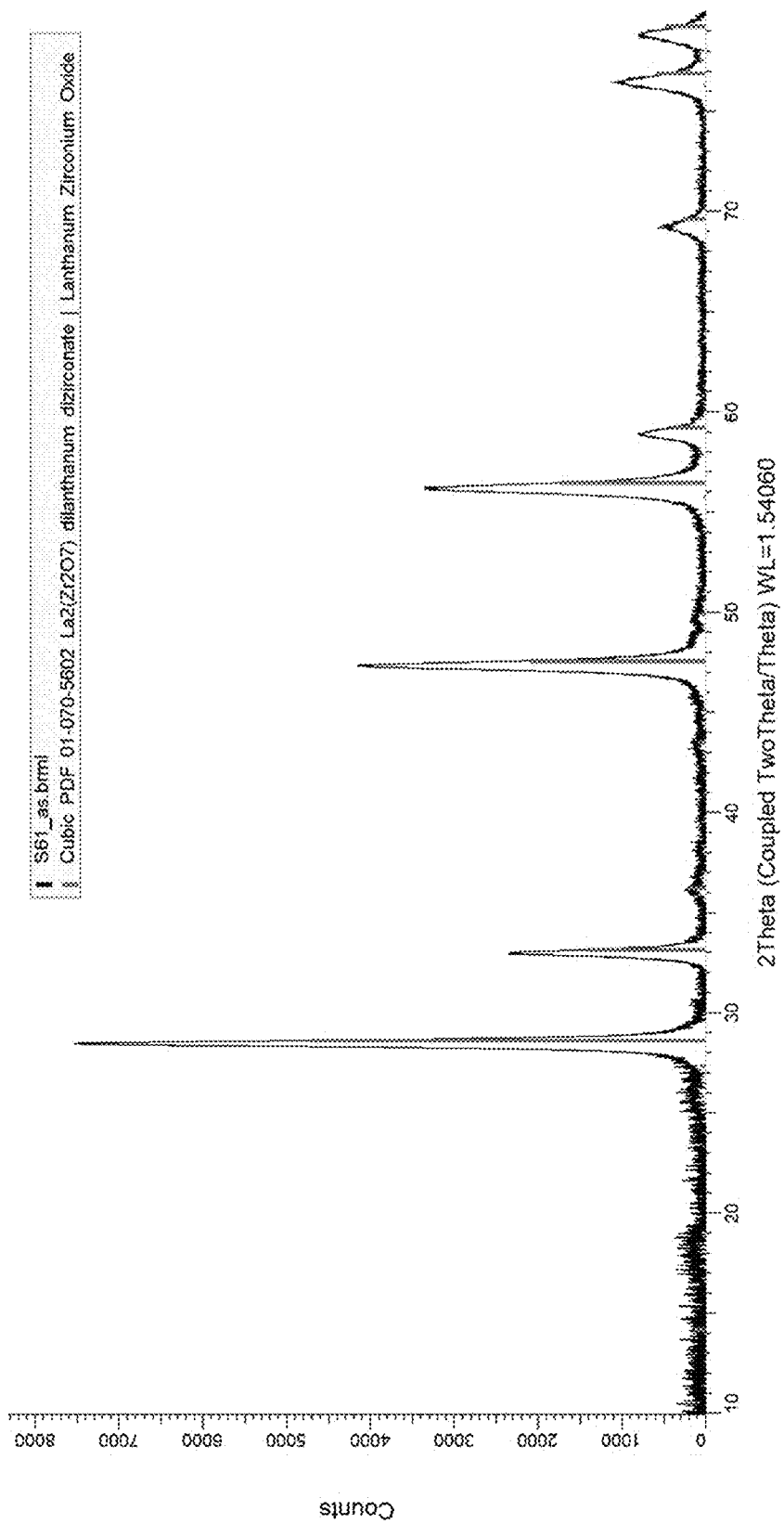
FIGS. 17A-17B show SOL 40, in accordance with embodiments herein, that is modified with a 5% lithium excess.
Figure 17B:
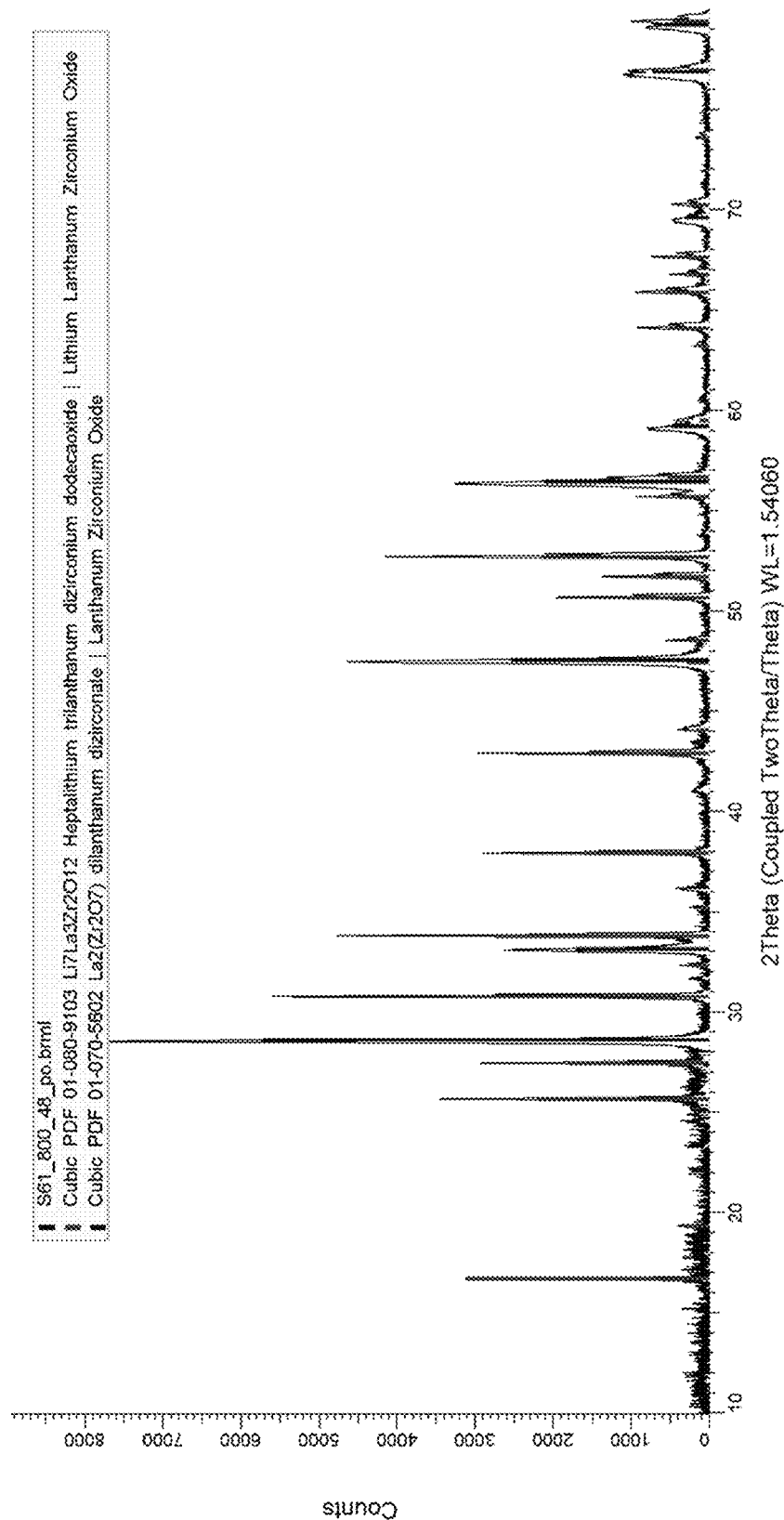

FIGS. 17A-17B show XRD counts for SOL 40, in accordance with embodiments herein, that is modified with a 5% lithium excess. Normally Li excess is used to offset Li loss at >1000° C. calcination temperature. However, the embodiments described herein achieve the desired cubic structure without the use of excessive lithium because of the reaction proceeding at a lower temperature.

Figure 18A:
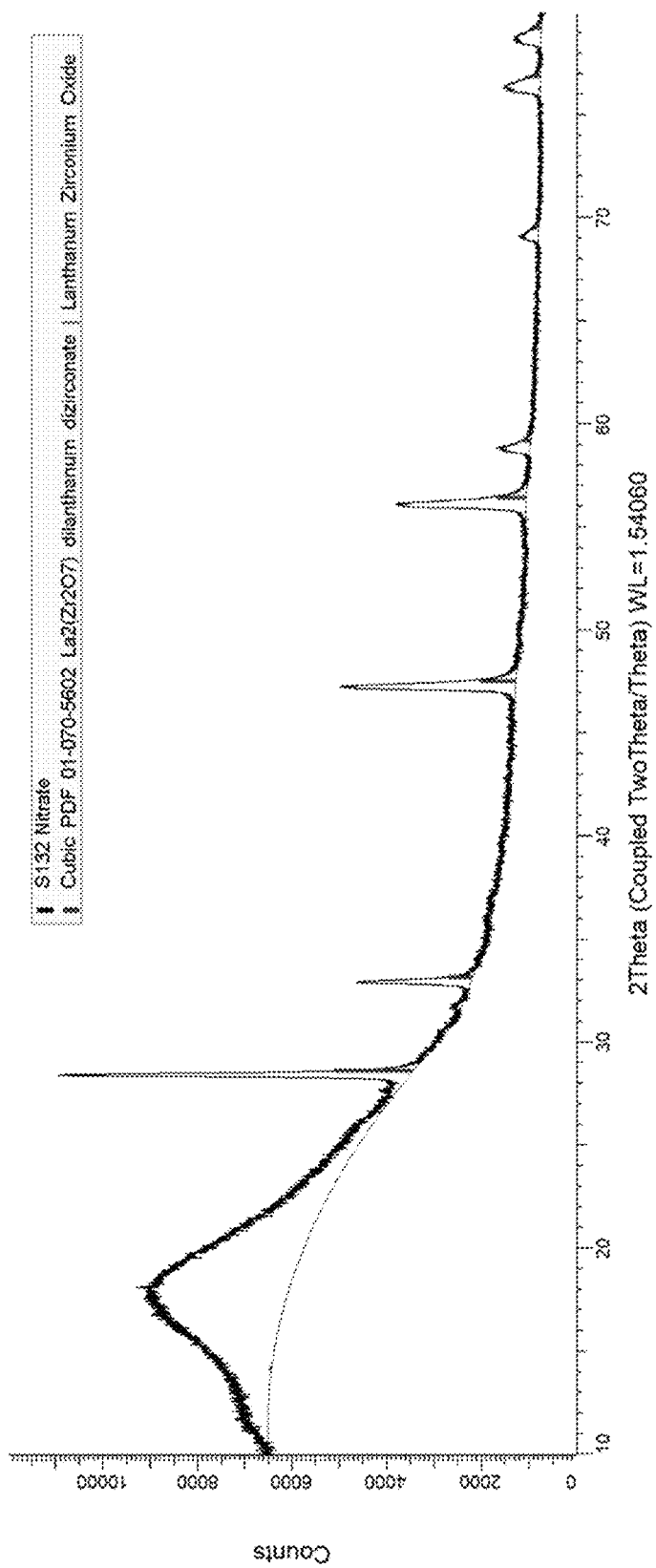
FIGS. 18A-18E illustrate SOL 132.
Figure 18B:
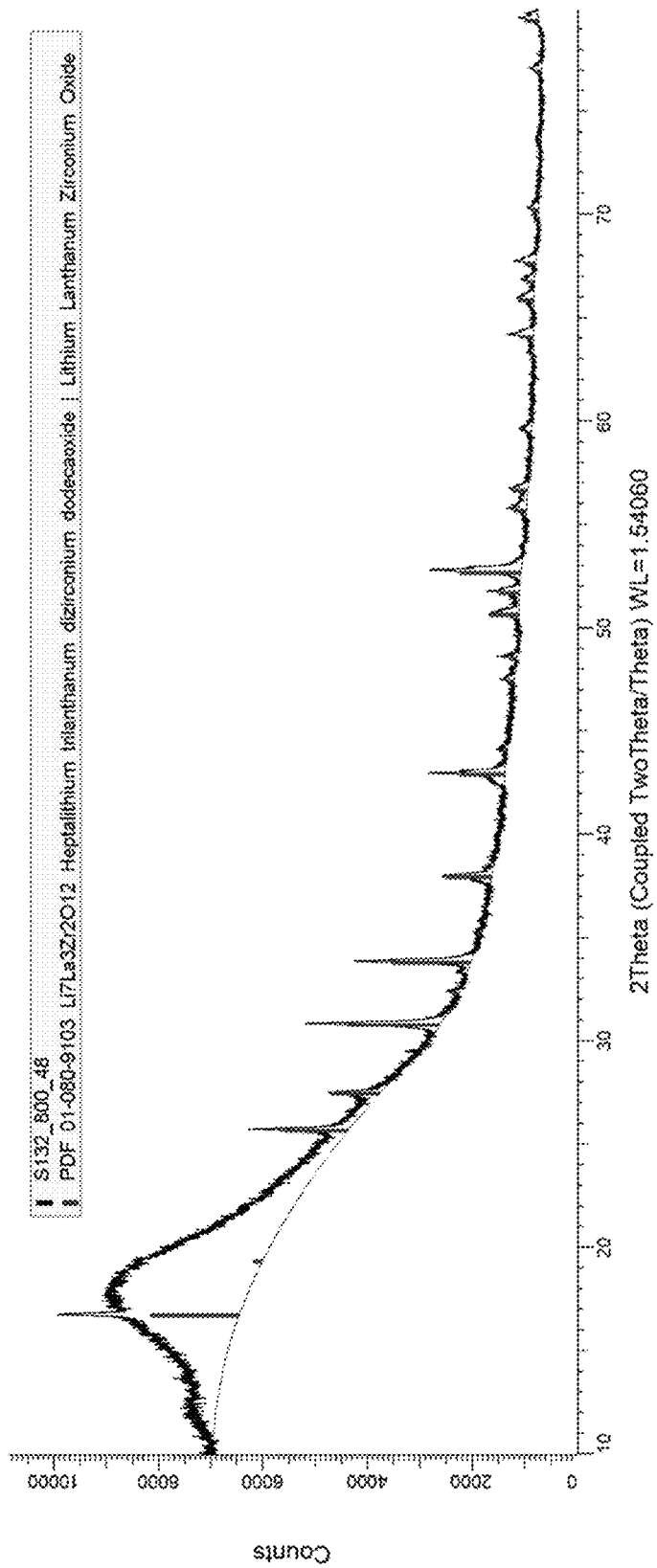
Figure 18C:
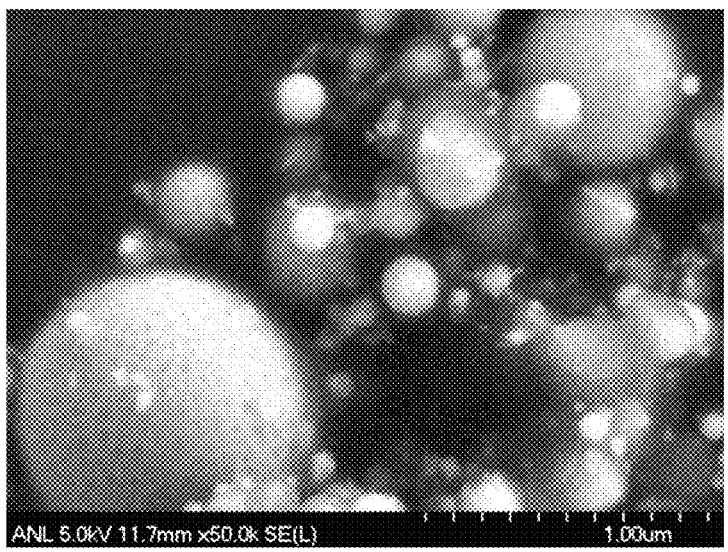
Figure 18D:
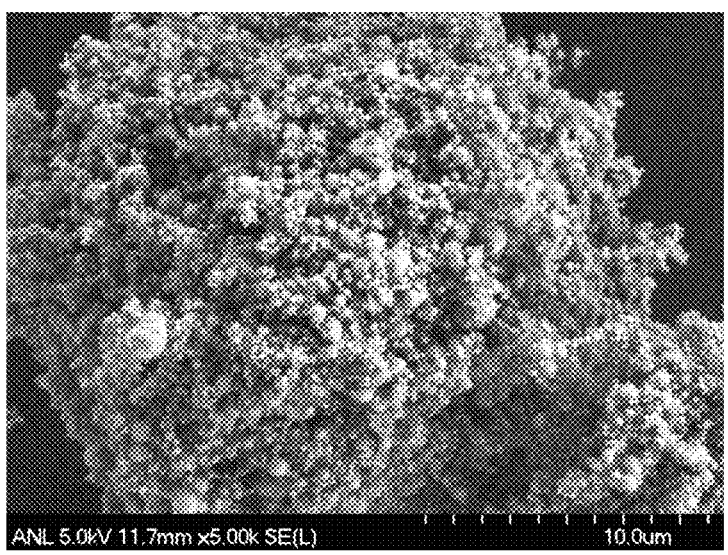
Figure 18E:
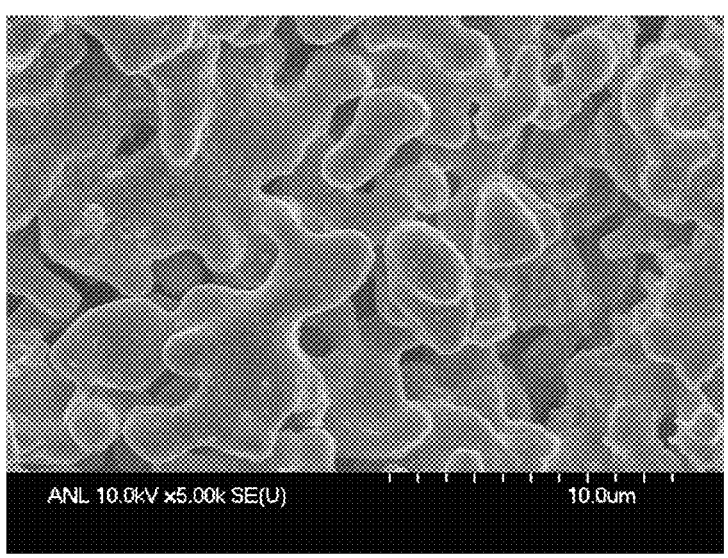

FIGS. 18A-18E illustrate SOL 132. FIG. 18A show the green powder x-ray diffraction analysis. FIG. 18B shows the x-ray diffraction analysis after calcination at 800° C. for 48 hours. FIGS. 18C-18D are SEM of the green powder morphology. FIG. 18E is an SEM of SOL132 following calcination at 800° C. for 48 hours.

Figure 19A:
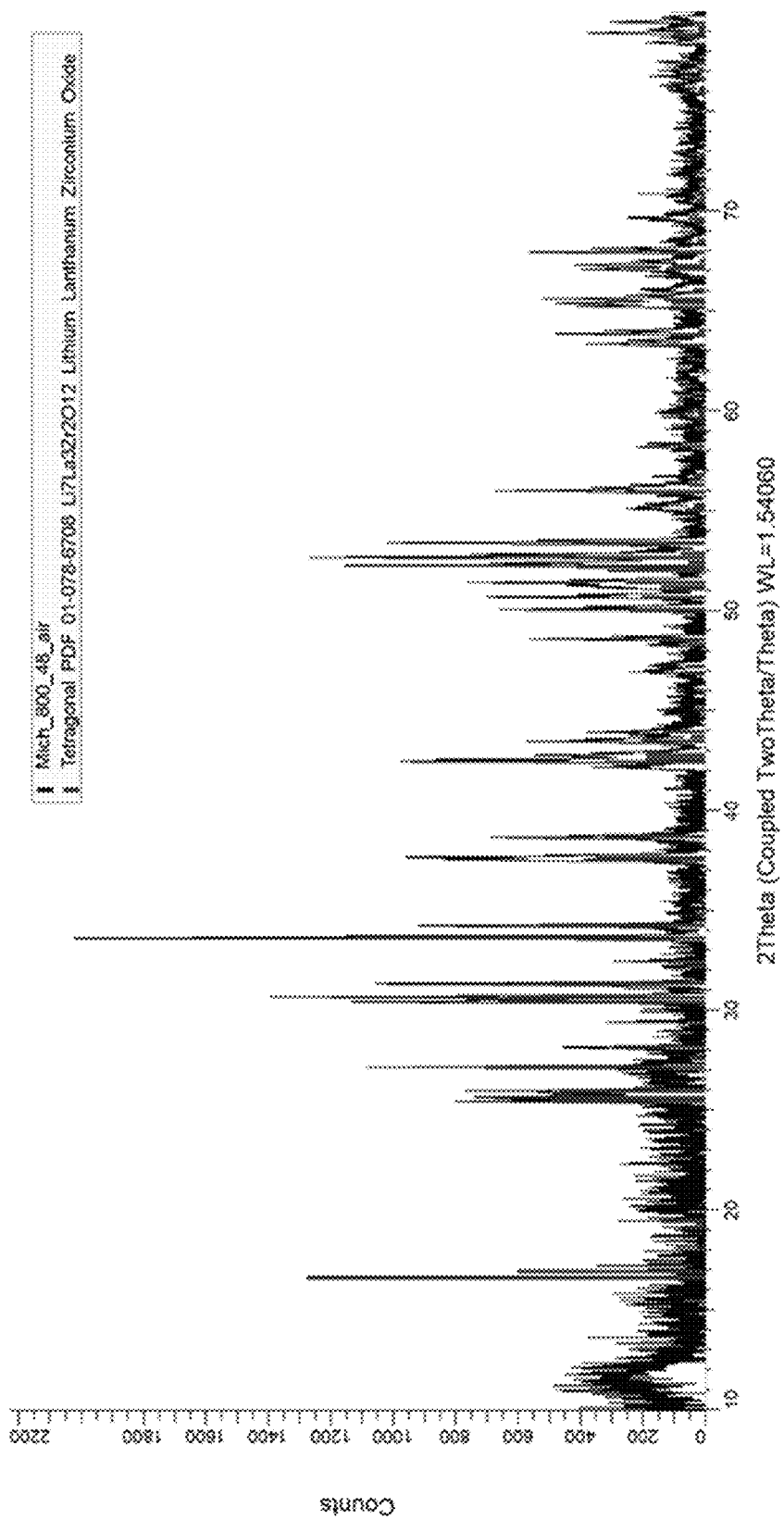
FIGS. 19A-19B illustrate S 130.
Figure 19B:
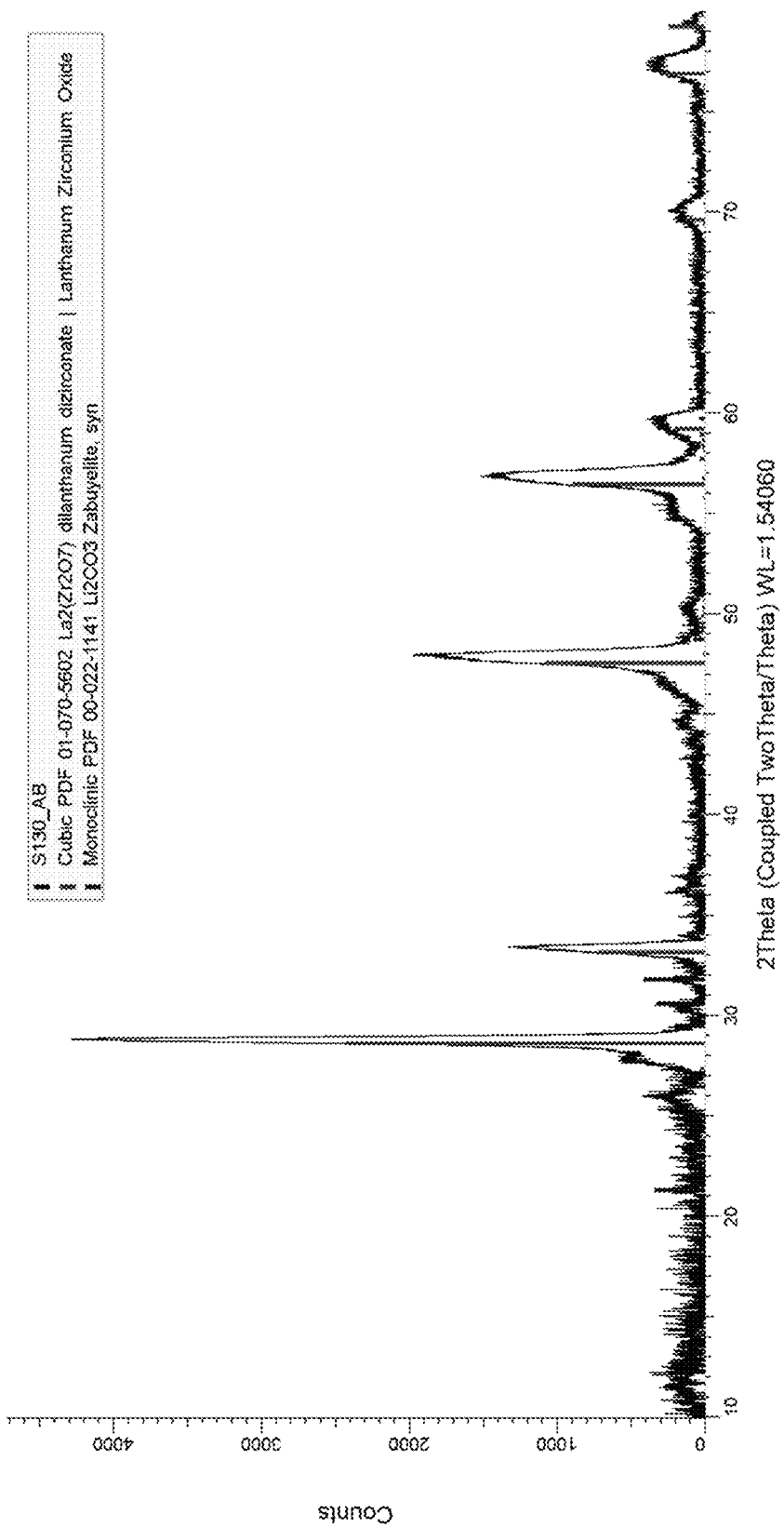
Figure 19C:
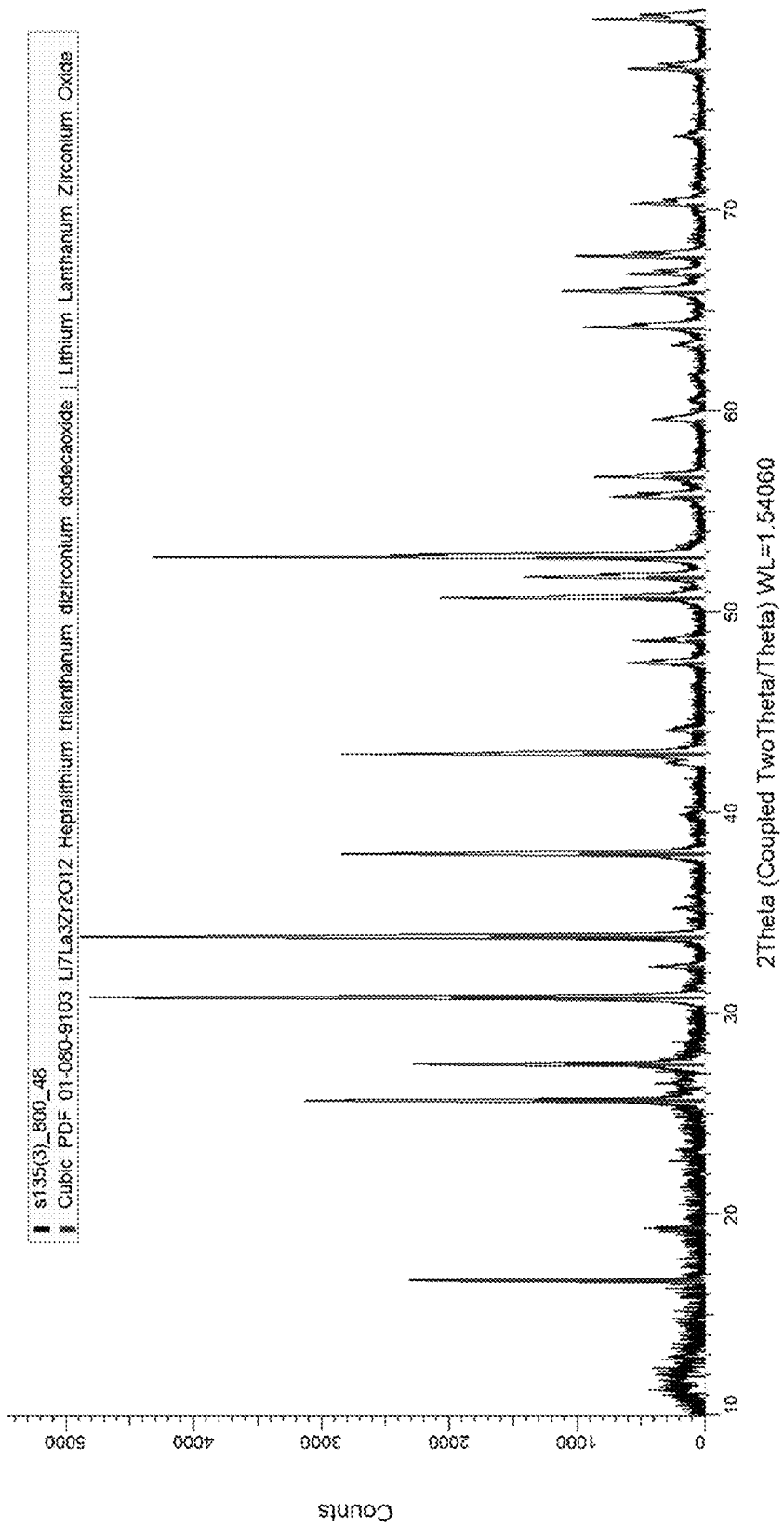
FIGS. 19C-19E illustrate S 135.
Figure 19D:
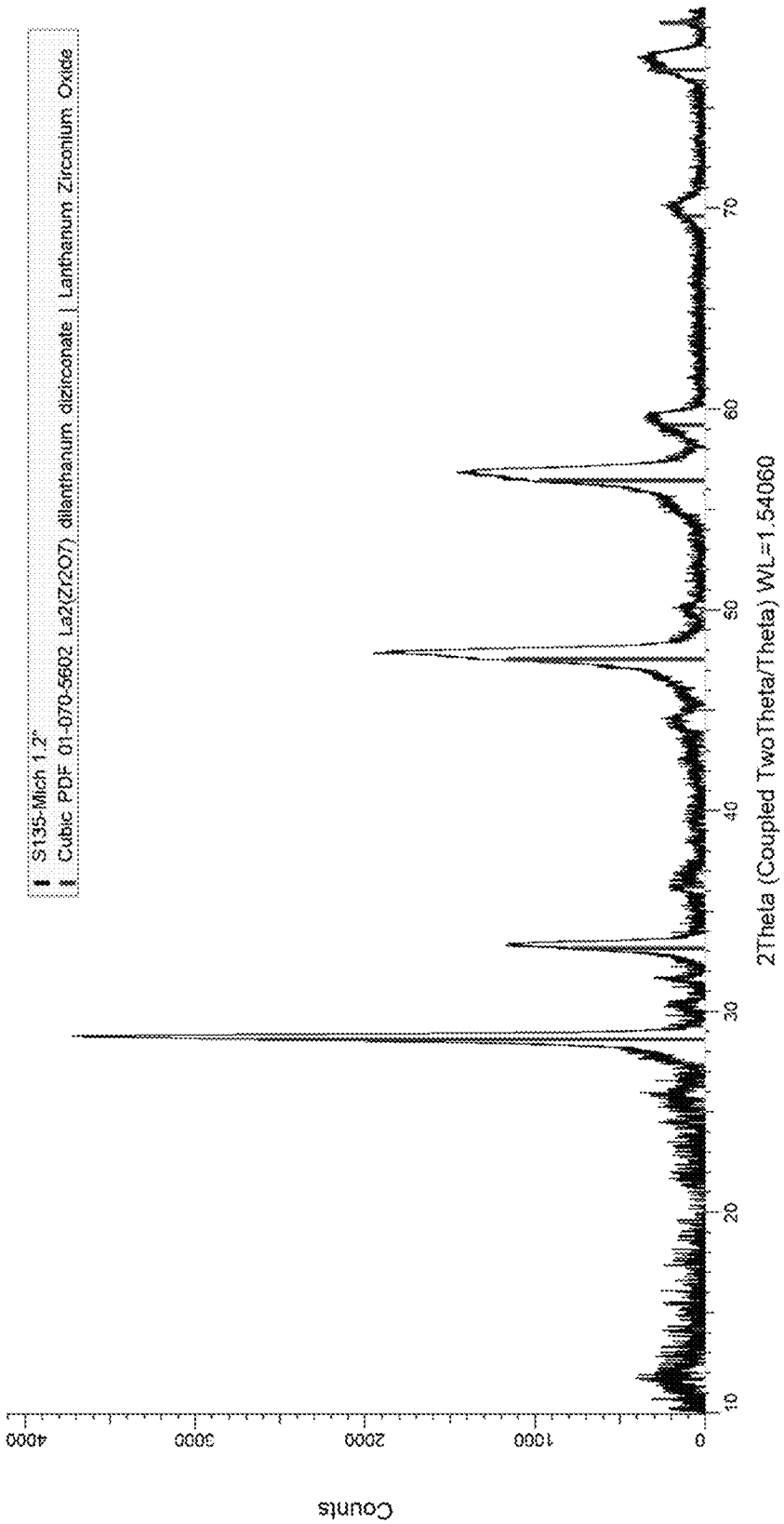
Figure 19E:
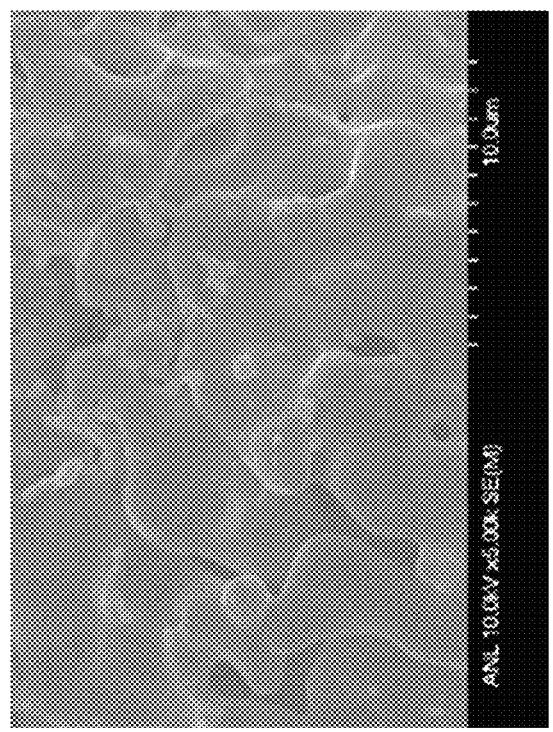

FIGS. 19A-19E compare the results of samples S130 and S135. FIG. 19A shows the x-ray diffraction analysis of S130 after calcination at 800° C. for 48 hours. FIG. 19B shows the x-ray diffraction analysis of S130 green powder FIG. 19C shows the x-ray diffraction analysis of S135 after calcination at 800° C. for 48 hours. FIG. 19D shows the x-ray diffraction analysis of S135 green powder. FIG. 19E illustrates by SEM the morphology of the calcined S135 sample. SOL130 and SOL135, both variants on SOL 133, were designed to test the flame temperature theory described herein. A single batch was prepared to be similar to SOL33. Less acetic acid was required to ensure a clear solution. S130 was performed to repeat the expectation that a tetragonal phase would result and this was indeed observed. S135 was then performed at the same FSP system setting with the exception of the use of a 1.2" ID alumina tube to confine the flame and retard radiative heat loss. The flow of $N_2$ quench gas was also lowered to additionally increase the flame temperature through the effect of lower gas dilution. Thus the exact same solution was made to switch from tetragonal to cubic outcome using a process configuration designed to increase the flame temperature.

In a further embodiment, a low enthalpy FSP solution, SOL127, was prepared using ethanol and nitrate salts of La, Zr, Li and aluminum. 5% water was added to facilitate dissolution of the nitrate salts. Due to the low solution enthalpy and non-flammability of the solute this sample was combusted primarily by the droplet to particle mode explained above. Sample, S132 produced by FSP processing of SOL127, produced a green powder with droplet to particle morphology but retaining the general XRD signature of all FSP samples. This sample calcined to cubic-LLZO at 800° C. The state of atomic mixing of the dopant in the LZO phase is believed to drive the positive outcome. The mode exhibited in this sample can also be characterized as Flame-Assisted-Spray-Pyrolysis and possesses many similarities to the SP experiments described below.

Figure 20A:
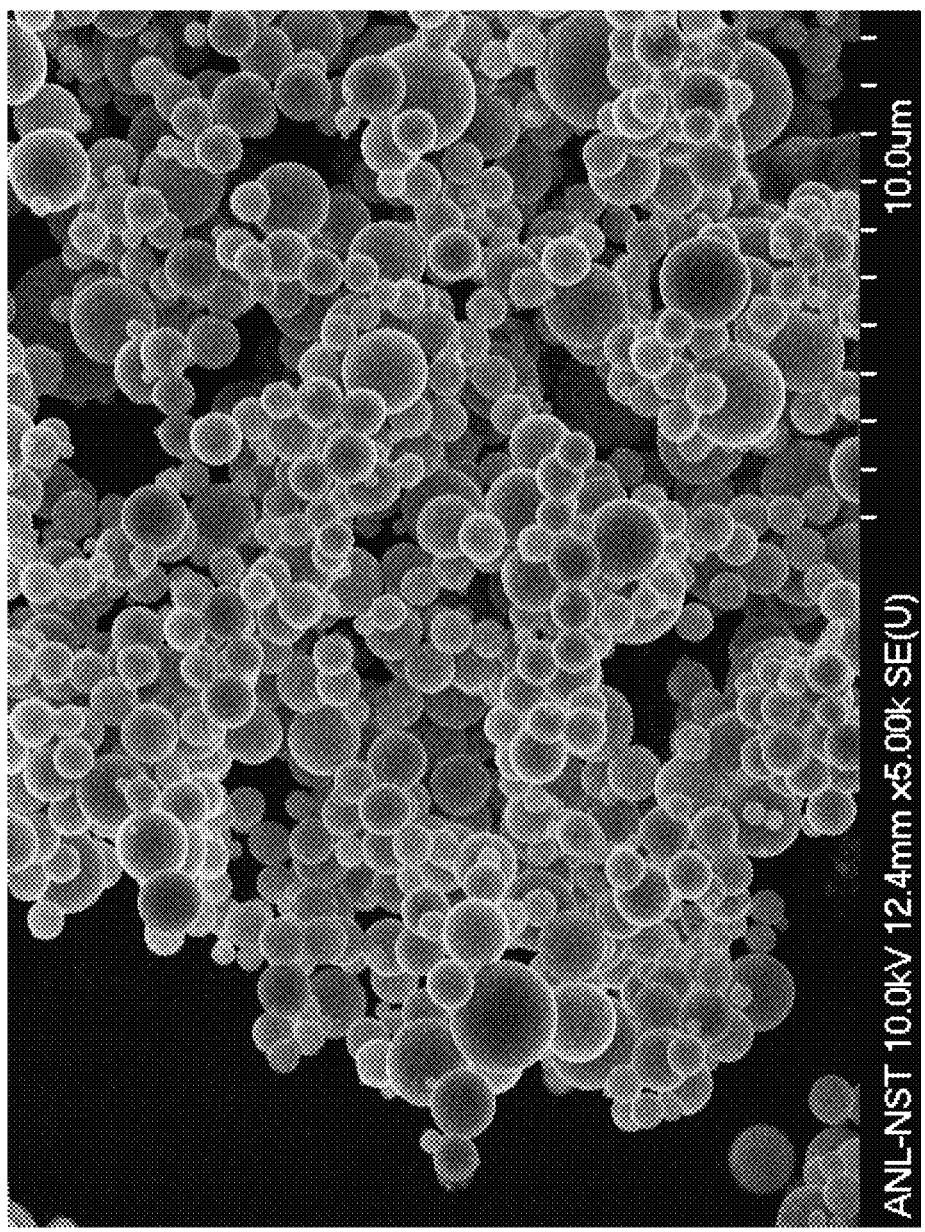
FIG. 20A-20C shows results for RST013.
Figure 20B:
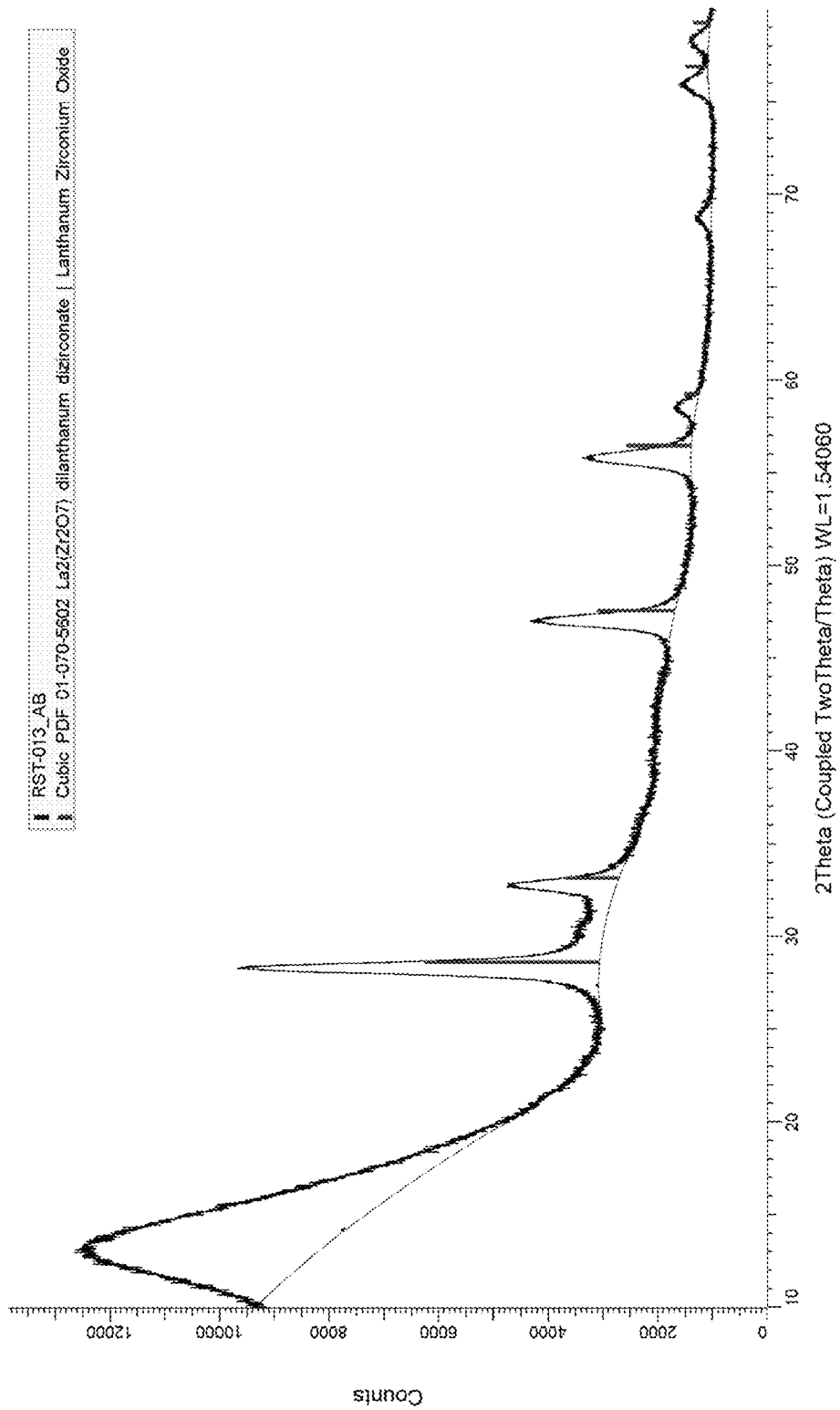
Figure 20C:
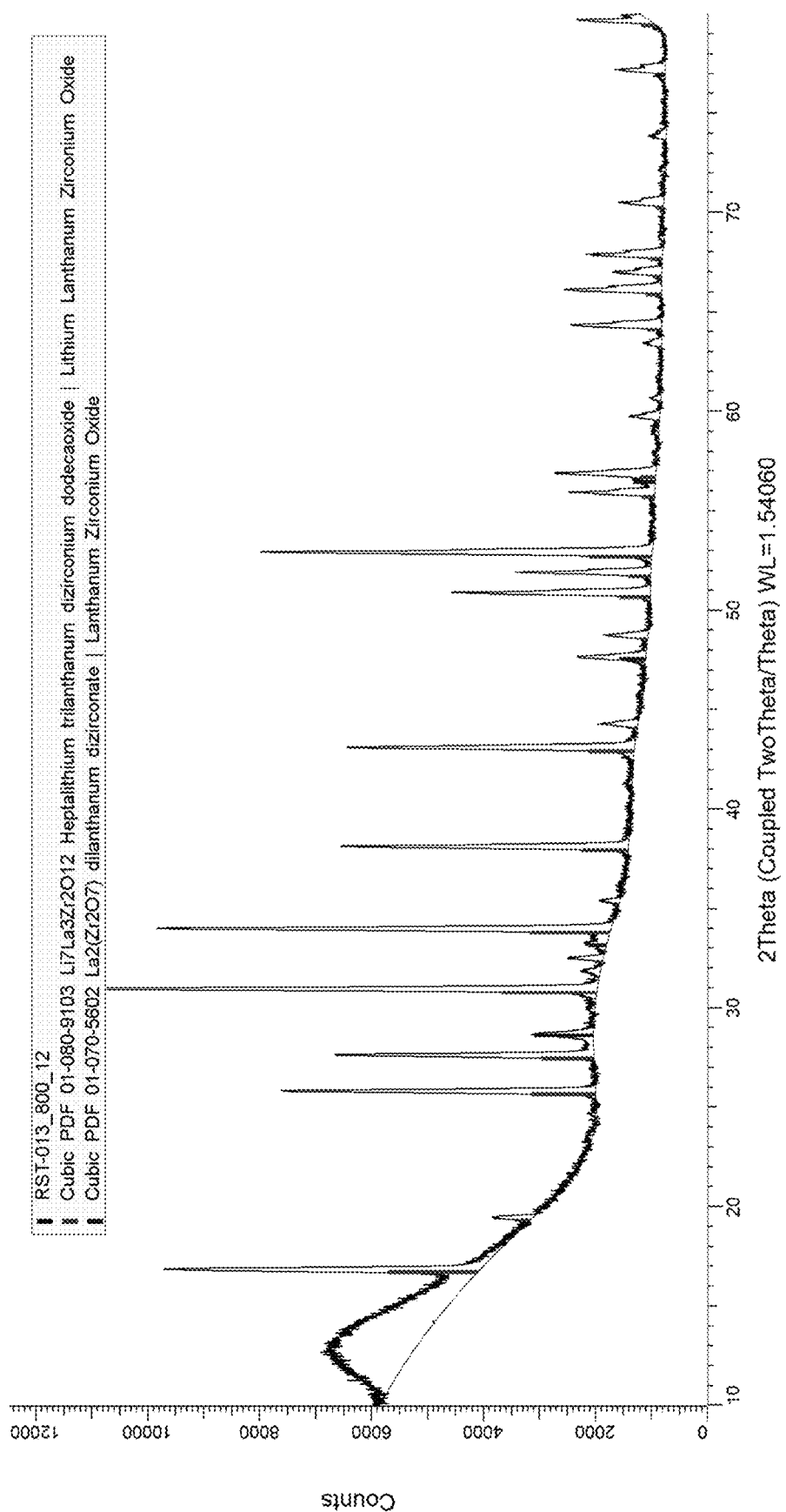

FIG. 20A-20C shows results for RST013. FIG. 20A show SEM of green powder. FIG. 20B shows the x-ray diffraction analysis for the green powder. FIG. 20C shows the x-ray diffraction analysis after calcination at 800° C. for 24 hours.

FSP LLZO Experimental Section

TABLE 4

Combustion solution compositions (IBR = isobutyrate, Prop = propionate).

| | % vol ETOH | % vol Acetic Acid | % vol Water | mg/ml Li Prop | mg/ml La IBR | mg/ml Zr IBR | mg/ml Alumatrane |
|---|---|---|---|---|---|---|---|
| SOL26 | 90.00 | 10.00 | — | 21.18 | 33.88 | 16.89 | — |
| SOL33 | 67.00 | 28.00 | 5.00 | 21.17 | 33.88 | 16.88 | 2.73 |
| SOL34 | 67.00 | 28.00 | 5.00 | 42.34 | 67.76 | 33.76 | 5.48 |
| SOL35 | 6.700 | 28.00 | 5.00 | 63.51 | 101.64 | 50.64 | 8.22 |

| | % Al-LLZO | % vol Octoic Acid | % vol Xylene | mg/ml Li-octoate | mg/ml La-octoate | mg/ml Zr-octoate | mg/ml Alumatrane |
|---|---|---|---|---|---|---|---|
| SOL40 | 3 | 25.13 | 74.87 | 43.96 | 53.26 | 41.47 | 3.14 |

TABLE 5

| Sample Designation | Formula | Phase at 800° C. |
|---|---|---|
| *Control Groups* | | |
| SOL33, 34, 35 | 3-9% loading in 90/10 ethanol/acetic acid | tetragonal |
| SOL38 | 3% loading via UMich prec. in 50/50 ethanol/propionic acid | cubic |
| SOL68 | 3% loading via UMich prec. in 50/50 xylene/propionic acid | tetragonal |
| *Embodiments* | | |
| SOL40 | 3% loading via ANL prec in 75/25 xylene/ethylhexanoic acid | cubic |
| SOL48 | 6% loading via ANL prec in 50/50/xylene/ethylhexanoic acid | cubic (did not repeat) |
| SOL40 + Zr | 3% loading via ANL prec in 75/25 xylene/ethylhexanoic acid + 10% excess Zr | tetragonal |

LLZO LF-FSP Precursors

Alumatrane (TD7-745)

A nitrogen-flushed 500 ml 3 neck flask was charged with Al(OCHMeCH$_2$CH$_3$)$_3$ (170 ml, Alfa A13044 lot N20A025) and stirred magnetically. Triethanolamine (89 ml, Alfa L04486 lot X31D703) was added dropwise via an additional funnel at room temperature. The addition time was 4 hours. The reaction is exothermic, keeping the reaction mixture at 25-30° C. throughout the addition. The initial clear yellow reaction turned cloudy white during the addition and re-clarified near the end. All stages are viscous. The liquid was then transferred under nitrogen to an amber bottle. 249.72 g was transferred as a 43.8% solution of alumatrane in sec-butanol. Over a period of several days, the alumatrane crystallized in the bottle. Mild heating is expected to re-dissolve the product, but this has not been tested.

Lithium Propionate (TD 7-751)

A nitrogen-flushed 1000 ml 3 neck flask with overhead stirring and a distillation head was charged with propionic acid (500 ml, EMD 654833 lot 57363405 710). Lithium hydroxide hydrate (113.16 g, Alfa 13409 lot Q13D018) was added in one portion, causing an exotherm from 20-70° C. The mixture was not completely soluble, and was initially heated to 150° C. with distillation of water to try and solubilize. No clear solution was obtained, and the reaction mass was cooled overnight. The mixture was recombined with the collected distillate and re-heated. This time, a clear solution was obtained around 100° C. The reaction was heated under nitrogen to remove water. As the water distilled, lithium propionate separated as a foamy suspension. The mixture was heated to reach a final temperature of 130° C. Water distilled out between 110-120° C. The reaction was held 2 hours at 130° C. and cooled. The solid mixture was filtered. The waxy material was washed with heptane to remove most of the residual propionic acid and air-dried 24 for hours under a nitrogen flow to yield 121 g.

The collected filtrate, containing substantial product, was re-charged to a 1 L flask along with 111 g of lithium hydroxide hydrate and 200 ml fresh propionic acid. This mixture completely solubilized at 106-109° C. Water was distilled as the mixture was heated to 130° C., with precipitation of the product.

The same isolation procedure returned 231 g of lithium propionate. Additional crops totaling ca. 50 g were obtained by rotary evaporation and precipitation with heptanes. FTIR of all collected solids were superimposable. The solids were combined as a free-flowing slightly waxy powder with a faint odor of propionic acid.

Lanthanum Isobutyrate (TD7-752, TD7-758 and TD7-759)

TD7-752. A 2 L 4-necked flask was charged with lanthanum oxide (130.17 g, TCI L0235 lot YFJJKBS) and isobutyric acid (550 ml, Aldrich W222208 lot MKCF1895). The mixture was heated slowly with overhead mechanical stirring to ~50° C. The reaction then began to self-heat and the water evolution caused a loss of material. After cooling, the solid mixture was re-heated to 140° C. to form a clear solution. Upon cooling, this formed a solid block. Heptane was added to disperse the solids. Filtration, washing and drying returned 211 g.

TD7-758. A 1 L 3-necked flask was charged with lanthanum oxide (65.07 g, TCI L0235 lot YFJJKBS) and isobutyric acid (300 mL, Aldrich W222208 lot MKCF1895). The mixture was heated slowly with magnetic stirring to ~50° C. The reaction then began to self-heat. An ice bath was immediately applied to control the exotherm. Upon cooling back to 70° C., the heating was resumed, in stages to 117° C., when water began to distill from the reaction, and further to 125° C., when a clear solution was obtained. The final temperature was 135° C., and held for 1 hour. Upon cooling, a solid block of material was obtained. This was dispersed in 200 ml heptane, filtered, and dried to give 176 g of lanthanum isobutyrate. The FTIR was identical to TD7-752 and these lots were combined.

TD7-759. Isobutyric acid (60 ml, Aldrich W222208 lot MKCF1895) was charged to the 150 ml EasyMax reactor under a nitrogen purge. Lanthanum oxide (65.07 g, TCI L0235 lot YFJJKBS) was added in 5 portions, monitoring the temperature each time. The first addition showed a significant incubation period, while subsequent additions were much faster to react. Overall, the heat of reaction is estimated at ~370 kJ/mol, although the final addition showed a proportionately larger and extended exotherm. Taking this into account, however, only lessened the estimate to 320 kJ/mol.

TABLE 6

| Wt | kJ | kJ/mol |
|---|---|---|
| 1.7876 | 1.599 | 291.4356 |
| 2.7157 | 2.603 | 312.2891 |
| 1.4848 | 1.452 | 318.6127 |
| 3.5057 | 3.825 | 355.4849 |
| 3.8360 | 5.602 | 475.8049 |

Zirconium Isobutyrate (TD7-753, TD7-754, TD7-765)

TD7-753. A 1 L 3-necked flask was charged with zirconium basic carbonate (43.22 g, Alfa 43245 lot W11D012) under a nitrogen purge. Isobutyric acid (190 mL, Aldrich W222208 lot MKCF1895) and isobutyric anhydride (175 mL, Alfa L13240 lot 10195627) were added, causing bubbling and a slight temperature drop of 20-15° C. The mixture was heated slowly with magnetic stirring to ~55° C., when upon a clear solution was obtained. The heating was continued in stages to a final temperature of 144° C. Water distilled out from ca. 125-140° C. Upon cooling, a clear colorless solution was obtained, contrary to the literature description.

The solution was then re-heated to 157° C. to distill excess isobutyric acid. Upon cooling, no precipitate appeared, so the isobutryic anhydride was distilled off under full vacuum at 70° C. to give a solid material. The solids were maintained at 70° C. for 90 minutes under full vacuum to give 51.78 g of material, far short of Zr(isobutyrate)4, which should yield 116 g. This yield may corresponds to a MW of 52/0.265=196 for a monomeric form, similar to $(Me_2CHCO_2)Zr(OH)_3$, which is 229.34. Expected yield of this form, based on moles of zirconium basic carbonate, would be 61 g.

TD7-754. A 1 L 3-necked flask was charged with isobutryic acid (300 mL, Aldrich W222208 lot MKCF1895), to which zirconium basic carbonate (150.74 g, Alfa 43245 lot W11D012) was added in portions under a nitrogen purge. Bubbling and a slight temperature drop of 20-15° C. were observed. The mixture was stirred 30 minutes to allow bubbling to cease. A second charge of 100 ml of isobutyric acid was added to thin out the suspension. The mixture was heated slowly with magnetic stirring to ca. 80° C., when isobutyric anhydride (100 mL, Alfa L13240 lot 10195627) was added. The heating was continued in stages to a final temperature of 144° C. Water distilled out from ca. 105-140° C. Upon cooling, a clear colorless solution was obtained, contrary to the literature description.

The solution was then re-heated to 157° C. to distill excess isobutyric acid. Upon cooling, no precipitate appeared, so the isobutryic anhydride was distilled off under full vacuum at 80° C. to give a solid material. The solids were maintained at 80° C. for 90 minutes under full vacuum to give 211 g of material. The FTIR of the two samples were identical, and the materials were combined.

TD7-765. A 500 mL 3-necked flask was charged with isobutryic acid (190 mL, Aldrich W222208 lot MKCF1895), to which zirconium basic carbonate (43.17 g, Alfa 43245 lot W11D012) was added in portions under a nitrogen purge. Bubbling and a slight temperature drop were observed. The mixture was stirred 30 minutes to allow bubbling to cease. The mixture was heated slowly with magnetic stirring to ca. 80° C., when the solids fully dissolved. The heating was continued in stages to a final temperature of 145° C., and held for 1 hour. Water distilled out from ca. 105-145° C. Upon cooling, a clear colorless solution (158 g) was obtained, which was transferred under nitrogen to an amber-bottle.

Lanthanum 2-Ethylcaprylate (TD7-763)

2-Ethylcaprylic acid (60 ml, TCI E0120 lot OQPPK EC) was charged to the 150 ml EasyMax reactor under a nitrogen purge. A single scoop of lanthanum oxide (13.36 g, TCI L0235 lot YFJJKBS) was added. No exothermic event was noted. Additional heating did not produce a reaction. The reaction was cooled and acetic acid (30 mL) was added, and then heated to 110° C. The material slowly solubilized. Portionwise addition of the remaining oxide showed exothermic reactions at each addition. The reaction was then heated to remove acetic acid. The solution clarified at ~170° C., but even after holding for an hour, solids precipitated on cooling. The reaction mass was transferred to a 100 mL 3-neck flask and heated to 215° C. for 30 minutes under a slow nitrogen purge. Upon cooling, a think yellowish solution was obtained. This was transferred to an amber bottle under nitrogen: 66 g.

Zirconium 2-Ethylcaprylate (TD7-768)

2-Ethylcaprylic acid (100 ml, TCI E0120 lot OQPPK EC) was charged to a 500 mL 3-neck flask. Zirconium basic carbonate (19.98 g, Alfa 43245 lot W11D012) was added in portions under a nitrogen purge. The suspension bubbled mildly, then was heated to 100° C. under nitrogen to form a clear solution. The solution was then heated in stages to 150° C. to remove water whilst purging strongly with nitrogen. The solution was held at 150° C. for 1 hour, then cooled to ambient. A slightly yellow solution was obtained (103.00 g), which was transferred to a 250 mL jar.

Lithium 2-Ethylcaprylate (TD7-769)

2-Ethylcaprylic acid (99.79 g, TCI E0120 lot OQPPK EC) was charged to a 250 mL 3-neck flask. Lithium hydroxide hydrate (10.05 g, Alfa 13409 lot Q13D018) was added under a nitrogen purge. The suspension was heated to 100° C. under nitrogen to form a mostly clear solution; this required 1-2 hours at 100° C. The solution was then heated in stages to 160° C. to remove water whilst purging strongly with nitrogen. The solution was held at 160° C. for 1 hour, then cooled to ambient. A colorless viscous solution was obtained (91.46 g), which was transferred, to ajar and stored under nitrogen.

Spray Pyrolysis

SP utilizes non-flammable solutions, typically aqueous solution with inorganic salts. Similar to the FSP embodiments described previously, the SP process provides a pathway for the formation of c-LLZO at sub-1000° C. temperatures. The SP process forms atomically mixed green powder. In one embodiment, SP produces green powder for cubic LLZO using aqueous solution of nitrate salts of Li, La, Zr, and Al. For this process the mode driving the atomically mixed state of the resultant green powder is entirely different than FSP, with the critical phenomena being the precipitation sequence of the individual solutes. For example, if one of the solutes (precursors or dopant) has exceptional solubility compared to the others, then that component will remain in solution longer and thus segregate at the dried particle stage (i.e., will not possess the atomically mixed state). Thus, the solvent and solute materials and the solute concentrations should be selected to achieve the desired atomic mixing, such as where the metals precipitate nearly simultaneously.

It is believed that in one embodiment, a molten state intermediate during the pyrolysis phase could remedy the situation by diffusion.

The SP process may utilize a range of precursors. The precursors should be those deployable as atomizable solutions. In particular, the precursors (and dopant) should be soluable at the 2-10% ceramic yield level.

During the operation of SP, the solution was fed into atomizer where ultrasonic transducer converts the solution into droplets. The droplets were transported by carrier gas into the reaction zone maintained at 700° C. where the droplets were converted into particles followed by decomposition of the nitrates into oxide particle and then collected by bag house. The carrier gas was air.

FIG. 20A-20C shows results for RST013. FIG. 20A show SEM of green powder. FIG. 20B shows the x-ray diffraction analysis for the green powder. FIG. 20C shows the x-ray diffraction analysis after calcination at 800° C. for 24 hours.

Figure 21:
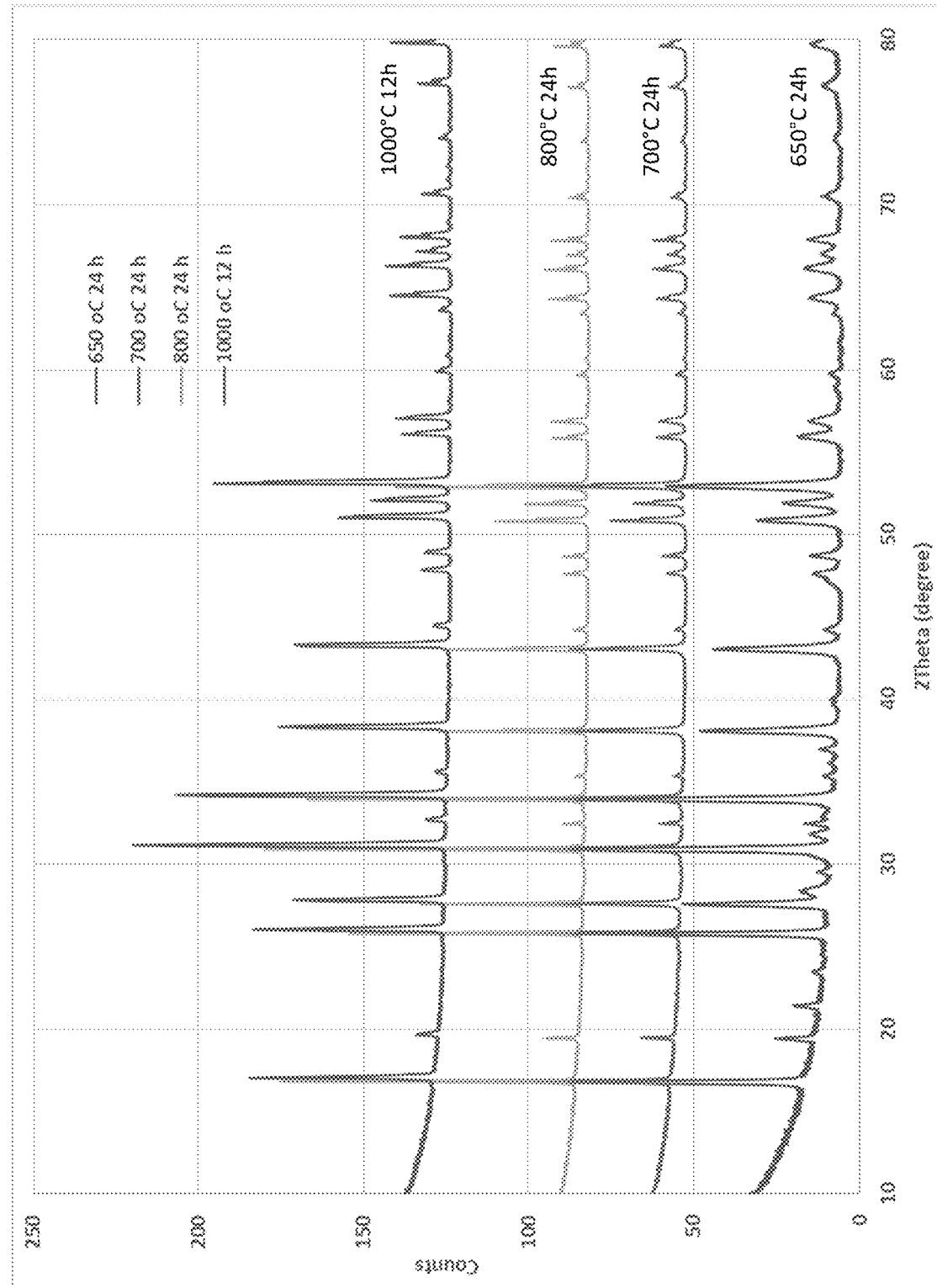
FIG. 21 shows the x-ray diffraction analysis of the evolution of the cubic LLZO phase as a function of calcination temperature for sample RST013.

FIG. 21 shows the x-ray diffraction analysis of the evolution of the cubic LLZO phase as a function of calcination temperature for sample RST013

FIG. 21 is the XRD of the green-body powders collected from SP. Cubic-LZO phase is the dominant phase with some $Li_2CO_3$ indicated. However, since there was no carbon source in the liquid feed, the lithium carbonated is concluded to have formed from the carbon dioxide present in the carrier gas which was compressed air in this case. Thus this sample contained a higher proportion of lithium hydroxide than FSP materials further reduces the temperature for conversion of the green powder into cubic LLZO.

Spray Drying

TABLE 9

The solution used for spray drying.

|  | SD001 |
|---|---|
| $Al(NO_3)_3$ (gram per gram solution) | 0.031 |
| $LiNO_3$ (gram per gram solution) | 0.29 |
| $La(NO_3)_3$ (gram per gram solution) | 58 |
| $ZrO(NO_3)_2$ (gram per gram solution) | 0.27 |
| Solution (gram) | 100 |

The method of Spray Drying was demonstrated using a Buchi unit. The solution was transported to an atomizer where droplets will be generated. The droplets were carried by preheated gas into chamber. The gas temperature has the lower limit determined the vapor pressure of the solution (e.g., 100° C. for aqueous solutions, 78° C. for ethanol-based solutions). They are numbered under standard condition. For conditions with different pressures, the lower limit will be even lower. The higher limit of the temperature range is determined by the gas-heating unit. The carrier gas can be inert gases ($N_2$ and Ar), oxidative gases (air and $O_2$), or reductive gases ($H_2$ and CO). The particle collection unit we used here is bag house. However, it can also be the filter pad, cyclones, or any instruments that can handle solid-gas separation. Cyclone was used as an example.

Figure 22:
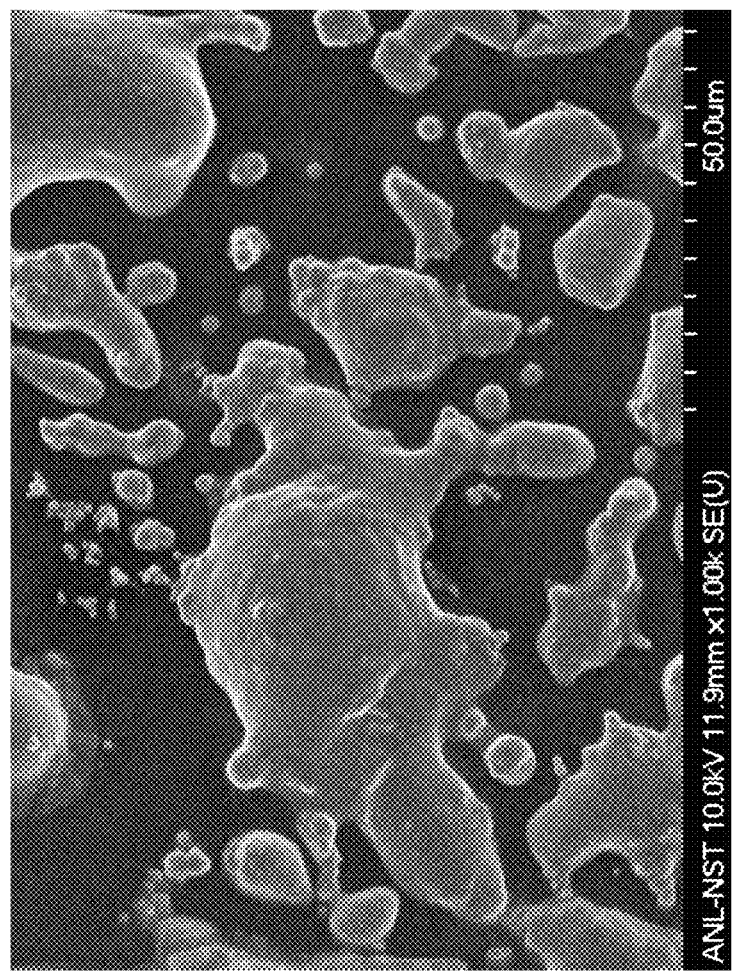
FIG. 22 shows the SEM of the green powder morphology of sample SD01.

FIG. 22 shows the SEM of the green powder morphology of sample SD01.

Figure 23:
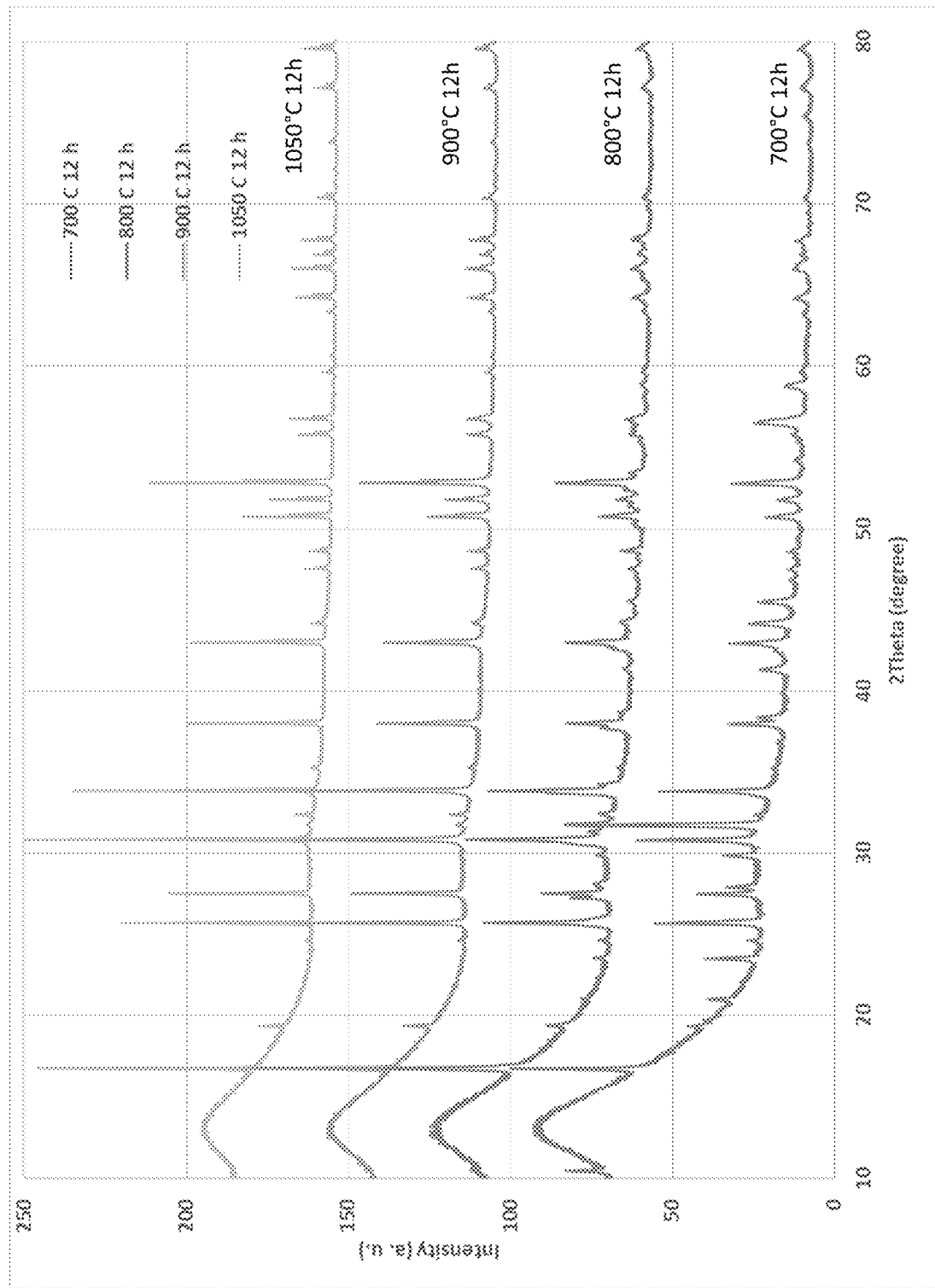
FIG. 23 shows the x-ray diffraction analysis of the evolution of the cubic LLZO phase as a function of calcination temperature for sample SD01.

FIG. 23 shows the x-ray diffraction analysis of the evolution of the cubic LLZO phase as a function of calcination temperature for sample SD01.

FIG. 23 shows the morphology of the green-body powders from spray drying. The irregular shape and wide size-distribution show the poor elemental mixing compared to the FSP and USP. The green-body powders are amorphous with no crystallinity meaning the low processing temperature of physically dries the droplet without any chemical reactions. The amorphous property of green-body powders is validated by FIG. 23. The formation of dried salts (including nitrates, sulfates, halides, carbonates, etc.) and the colloids result in the poor mixing of elements. It is due to the low temperature to hinder the mixing, the aggregation of the salts, and/or the large anionic group.

FIG. 23 shows the emergence of c-LLZO after the green-body powders were calcined at 700° C. and 800° C. However, c-LLZO phase is not the dominant phase in neither of them. Although c-LLZO phase is the dominant one, the existence of tiny-amount phase represented by the peak at 31.5° indicates the conversion of c-LLZO was not completed. The tiny phase could be the lithium salts or any impurities. Its existence demonstrates the conversion temperature was further increased in spray drying method due to the relatively poor mixing compared to the FSP or USP. However, the mixing is still better compared to the traditional solid-state reaction methods including high-energy ball-milling by which the repeated calcinations over 1000° C. for tens of hours are demanded.

Definitions

No claim element herein is to be construed under the provisions of 35 U.S.C. § 112(f), unless the element is expressly recited using the phrase "means for."

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

What is claimed is:

1. A method, comprising:
   mixing metal nitrate salts comprising lanthanum nitrate, lithium nitrate, aluminum nitrate, and zirconium nitrate;
   forming a feed solution comprising a dopant with the metal nitrate salts in a solvent;
   generating a droplet from the feed solution;
   converting the droplet to an atomically mixed powder; and
   calcining the atomically mixed powder at a temperature less than 1000° C., forming cubic LLZO.

2. The method of claim 1, wherein the solvent is flammable and converting the droplet to a powder comprises flame spray pyrolysis.

3. The method of claim 1, wherein the dopant comprises aluminum, the dopant being different a different composition than the aluminum nitrate.

4. The method of claim 1, wherein the calcining is at a calcination temperature is below 800° C.

5. The method of claim 1, wherein the calcining is at a calcination temperature is 650° C. to 900° C.

6. The method of claim 1, wherein converting the droplet to a powder comprises converting at least a portion of the droplets to particles without combusting the portion of the droplets.

7. The method of claim 1, converting the droplet to a powder comprises combusting a second portion of the droplets a flame forming a gas and further converting the gas into particles.

8. The method of claim 1, where converting the droplet comprises drying the droplets via a spray drying process.

9. The method of claim 1, wherein converting the droplet comprises pyrolysis via a spray pyrolysis process.

10. A method, comprising:
    forming a feed solution comprising an aluminum dopant, lanthanum precursor, lithium precursor, and zirconium precursor dissolved in a solvent comprising xylene and ethylhexanoic acid;
    generating a plurality of droplets 2-10 microns in diameter;
    exposing the plurality of droplets to a flame;
    converting at least a portion of the plurality of droplets to particles, forming a powder comprising atomically mixed aluminum, lanthanum, lithium, and zirconium; and
    calcinating powder at a calcine temperature of 650° C. to 1000° C. to form a cubic LLZO.

11. The method of claim 10, wherein the aluminum dopant is alumatrane.

12. The method of claim 10, wherein the feed solution comprises 3-9% ceramic loading.

13. The method of claim 10, wherein exposing the plurality of droplets to the flame comprise directing the flame with a flame guide.

14. The method of claim 10, wherein the cubic LLZO has a formula of $Li_{(7-3x)}La_2Zr_3O_7Al_x$ where x is 0.19 to 0.389.

15. The method of claim 10, wherein the cubic LLZO has a formula of $Li_{(7-3x)}La_2Zr_3O_7Al_x$ where x is 0.25.

* * * * *